(12) United States Patent
Iwamoto et al.

(10) Patent No.: US 8,842,250 B2
(45) Date of Patent: Sep. 23, 2014

(54) LIQUID CRYSTAL DISPLAY HAVING PIXEL ELECTRODES WITH TILTED PIXEL EDGES

(75) Inventors: Yoshihisa Iwamoto, Tokyo (JP); Kunihiko Katano, Tokyo (JP); Hiroto Fukushima, Tokyo (JP)

(73) Assignee: Stanley Electric Co., Ltd., Yokohama-shi (JP)

( * ) Notice: Subject to any disclaimer, the term of this patent is extended or adjusted under 35 U.S.C. 154(b) by 423 days.

(21) Appl. No.: 13/280,640

(22) Filed: Oct. 25, 2011

(65) Prior Publication Data

US 2012/0105786 A1 May 3, 2012

(30) Foreign Application Priority Data

| Oct. 27, 2010 | (JP) | 2010-241238 |
| Oct. 27, 2010 | (JP) | 2010-241386 |
| Oct. 27, 2010 | (JP) | 2010-241408 |
| Nov. 26, 2010 | (JP) | 2010-263294 |

(51) Int. Cl.
*G02F 1/1343* (2006.01)
*G02F 1/1337* (2006.01)
*G02F 1/139* (2006.01)

(52) U.S. Cl.
CPC .. *G02F 1/13378* (2013.01); *G02F 2001/13373* (2013.01); *G02F 1/134336* (2013.01); *G02F 1/1393* (2013.01)
USPC ........... 349/146; 349/128; 349/130; 349/132; 349/145

(58) Field of Classification Search
USPC ................. 349/145–146, 128, 130, 132, 139
See application file for complete search history.

(56) References Cited

U.S. PATENT DOCUMENTS

| 7,697,101 | B2 * | 4/2010 | Hong | 349/146 |
| 8,330,913 | B2 * | 12/2012 | Katayama et al. | 349/123 |

FOREIGN PATENT DOCUMENTS

| JP | 2000-193980 A | 7/2000 | |
| JP | 2005-234254 A | 9/2005 | |
| JP | 2009-086214 A | 4/2009 | |
| JP | 2009-156930 A | 7/2009 | |
| JP | 2010-224233 A | 10/2010 | |
| JP | 2010224233 A * | 10/2010 | |
| WO | WO 2010001647 A1 * | 1/2010 | G02F 1/139 |

OTHER PUBLICATIONS

Japanese Office Action dated Aug. 30, 2013 in counterpart Japanese Application No. 2010-263294.

(Continued)

*Primary Examiner* — Bumsuk Won
*Assistant Examiner* — Paisley L Arendt
(74) *Attorney, Agent, or Firm* — Holtz Holtz Goodman & Chick PC

(57) ABSTRACT

A liquid crystal display device includes a first and a second substrate placed opposite each other, a first electrode provided on the first substrate extending in a first direction, a second electrode provided on the second substrate extending in a second direction that is orthogonal to the first direction, and a vertically-aligned liquid crystal layer provided between the two substrates. A pixel is defined where the two electrodes intersect, and alignment treatment is performed to the first or second substrate in a direction parallel to the first direction. The first electrode has a linear shape in which electrode edges on either side extend in the first direction, and the second electrode is of a polygonal line shape in which an electrode edge of one side includes a line segment which obliquely crosses the first direction, and the pixel is demarcated by pixel edges including obliquely crossing line segments.

6 Claims, 19 Drawing Sheets

(56) References Cited

OTHER PUBLICATIONS

Japanese Office Action dated Jul. 5, 2013 in counterpart Japanese Application No. 2010-241238.

Japanese Office Action dated Jul. 5, 2013 issued in counterpart Japanese Application No. 2010-241386.

Japanese Office Action dated Mar. 28, 2014 in counterpart Japanese Application No. 2010-241408.

* cited by examiner

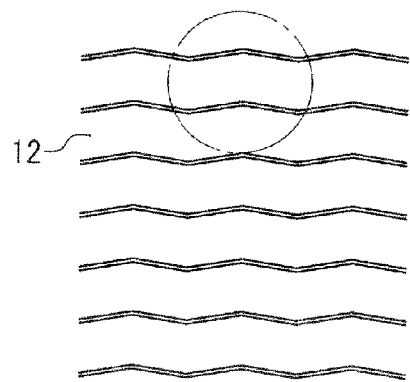 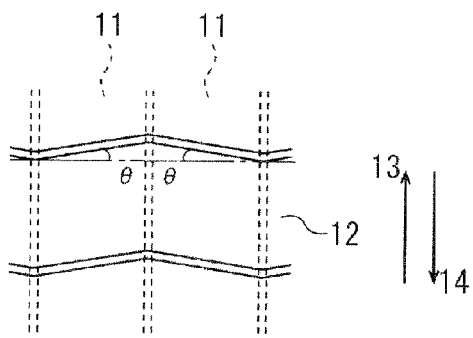
Fig.5A  Fig.5B
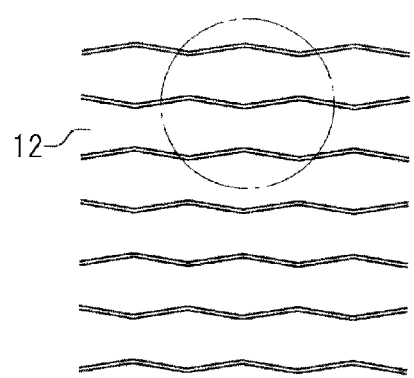 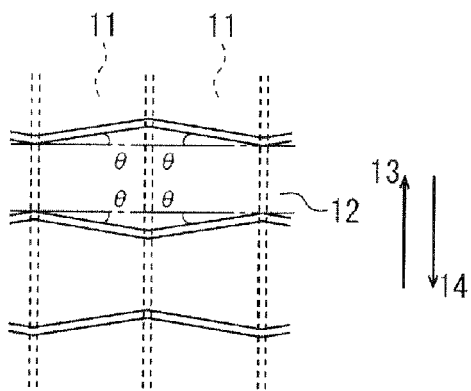
Fig.6A  Fig.6B

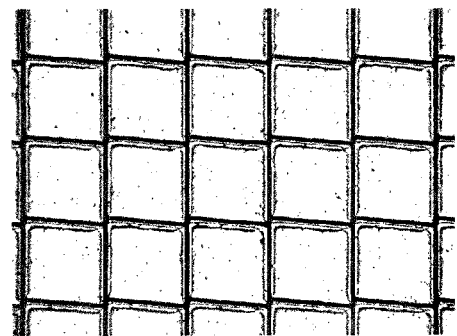
Fig.9A
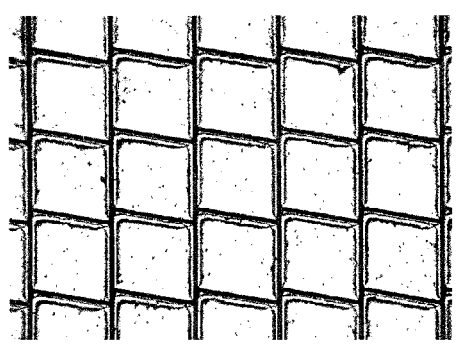
Fig.9B
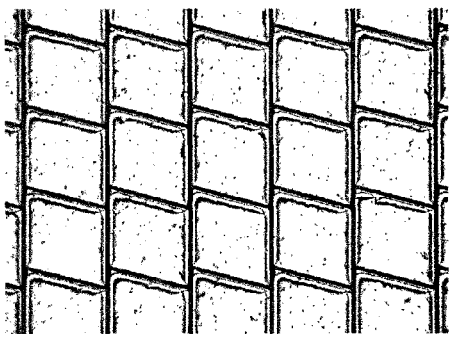
Fig.9C
Fig.10
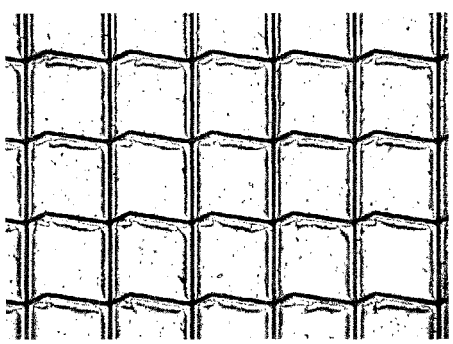

Fig.11
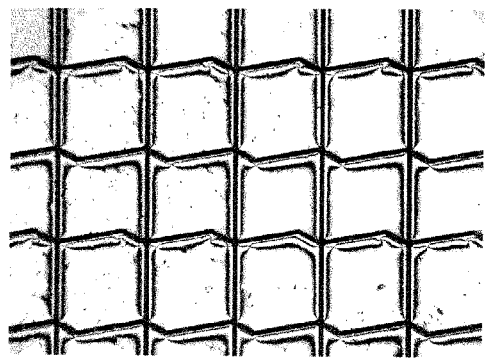
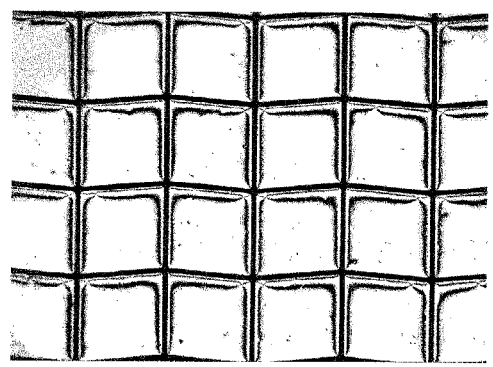
Fig.12A
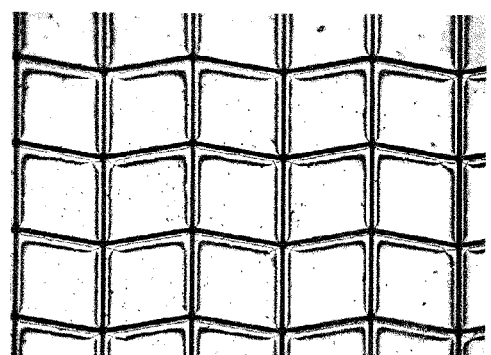
Fig.12B
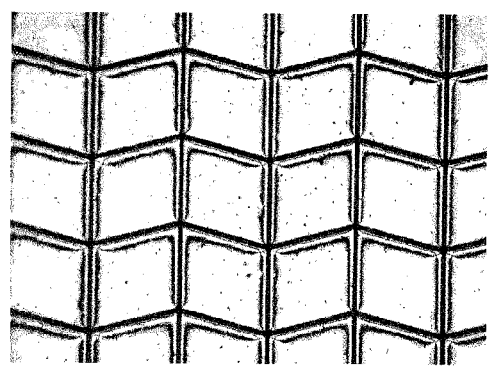
Fig.12C

Fig.13
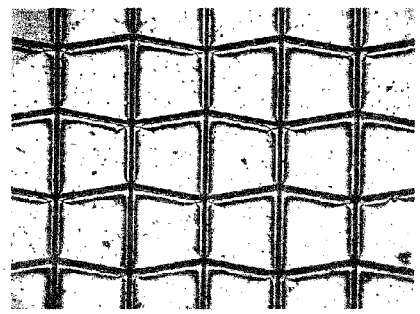
Fig.14
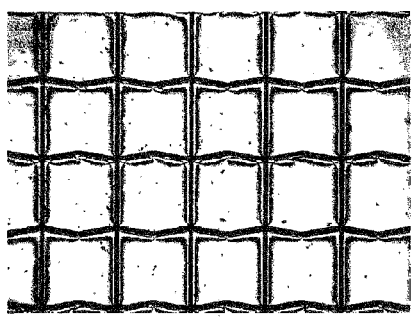
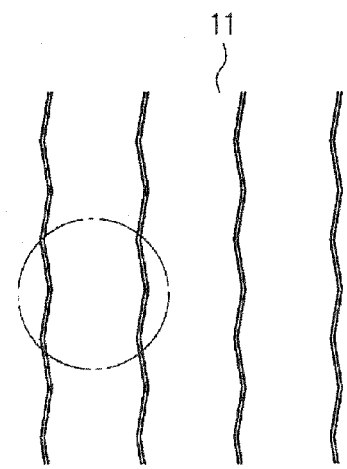
Fig.15A
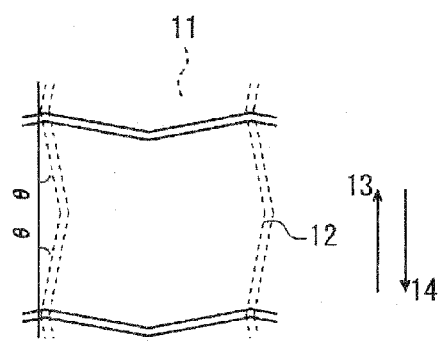
Fig.15B

Fig.24
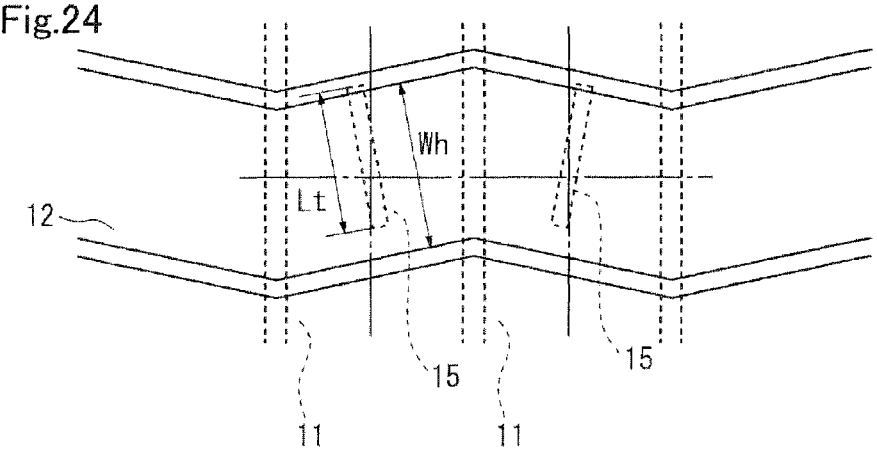
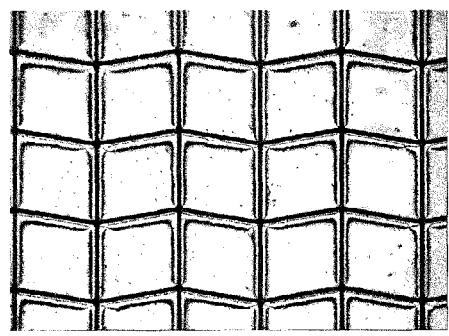
Fig.25A
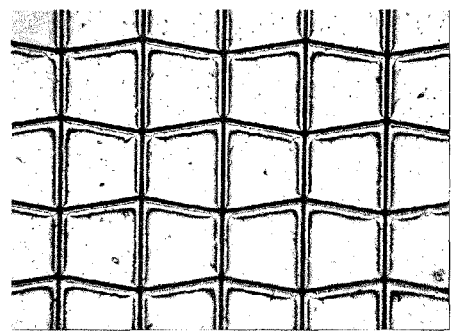
Fig.25B
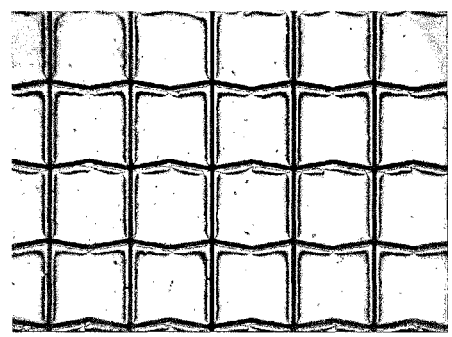
Fig.25C

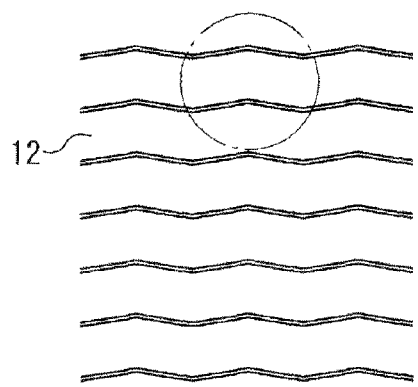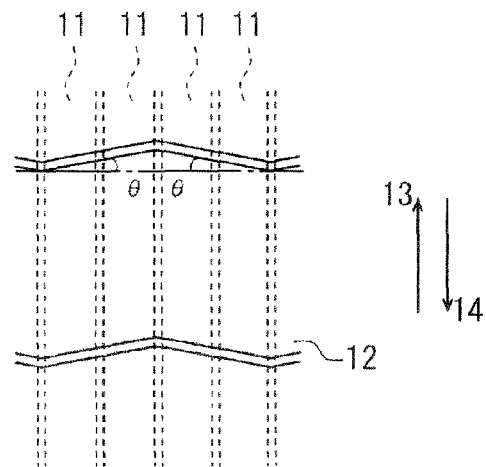
Fig.28A　　　　　　　　Fig.28B
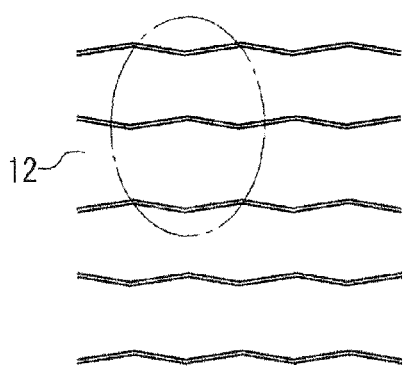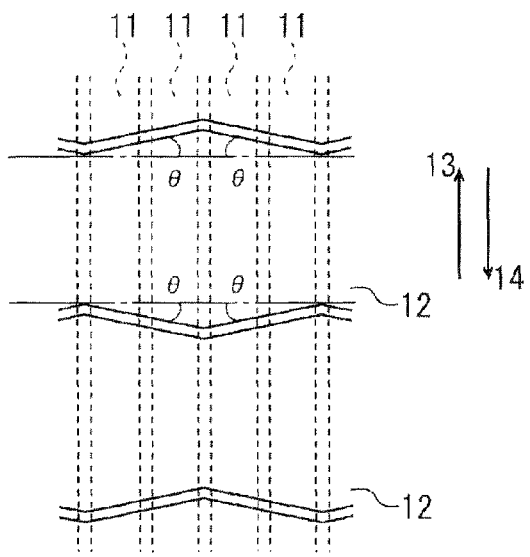
Fig.29A　　　　　　　　Fig.29B

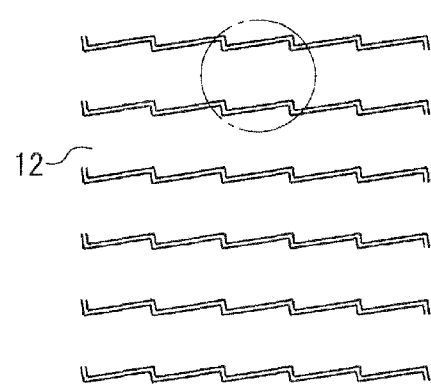
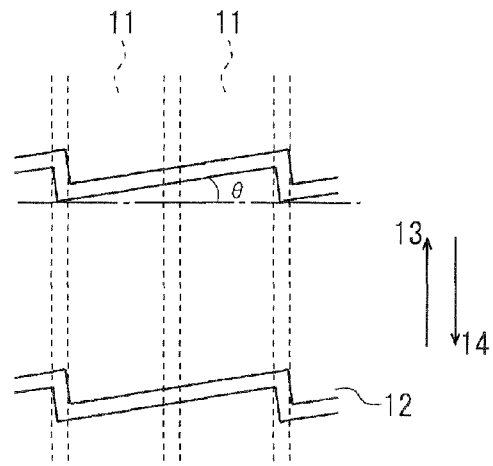
Fig.30AFig.30B
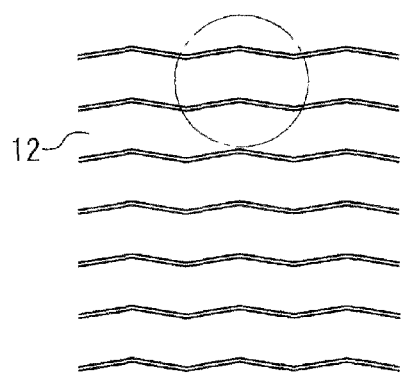
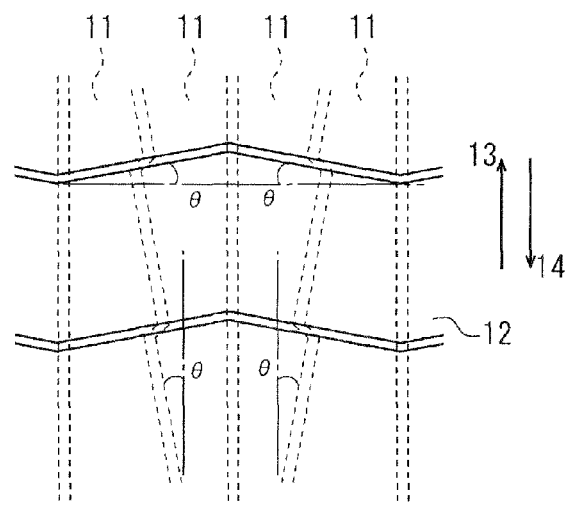
Fig.31AFig.31B

"PRIOR ART"

"PRIOR ART"

LIQUID CRYSTAL DISPLAY HAVING PIXEL ELECTRODES WITH TILTED PIXEL EDGES

BACKGROUND OF THE INVENTION

1. Field of the Invention

The present invention relates to a vertical alignment liquid crystal display device which is driven by multiplex driving.

2. Description of the Background Art

A liquid crystal display device is broadly used as an information display unit in various electronic devices for consumer or automobile use. In General, a liquid crystal display device is configured by disposing a liquid crystal layer made of a liquid crystal material between two substrates that are placed opposite each other with a gap of roughly several micrometers. As one type of this kind of liquid crystal display device, a vertical alignment liquid crystal display device is known (For example, refer to Japanese Unexamined Patent Application publication No. 2005-234254). A vertical alignment liquid crystal display device comprises, as its main components, liquid crystal cells of a VA mode in which liquid crystal molecules are aligned substantially vertically relative to the surface of the respective substrates within the liquid crystal layer that are disposed between the two substrates, and polarizers that are respectively provided to the outside of the liquid crystal cells. The respective polarizers are often provided in a crossed Nicol arrangement. Based on the foregoing arrangement, since the transmittance of the liquid crystal display device during the non-application of voltage will be extremely low, it is possible to realize a high contrast relatively easily.

When realizing image display by a liquid crystal display device based on multiplex driving, for instance, substrates respectively having a striped-shaped electrode are placed opposite each other so that the extending directions of the respective electrodes become substantially orthogonal, and the regions where the electrode of one substrate and the electrode of the other substrate intersect become the pixel, respectively. Here, the shape of the respective pixels is substantially rectangular. Moreover, alignment treatment such as rubbing treatment is performed on the surface of the respective substrates. The direction of the alignment treatment to be performed on the surface of the respective substrates is set, for example, in opposite directions (anti-parallel alignment). Consequently, the alignment direction of the liquid crystal molecules during the non-application of voltage settles into one direction at the substantial center in the layer thickness direction of the liquid crystal layer provided between the substrates. For example, when the direction of the alignment treatment to the respective substrates is set to the 6 o'clock direction and the 12 o'clock direction when viewed from the front of the liquid crystal display device, the alignment direction of the liquid crystal molecules settles into the 6 o'clock direction at the substantial center of the liquid crystal layer. Here, the extending direction of the electrode of one substrate becomes substantially parallel to the alignment direction of the liquid crystal layer at the substantial center of the liquid crystal layer, and the extending direction of the electrode of the other substrate becomes substantially orthogonal.

In the foregoing vertical alignment liquid crystal display device, considered is a case of disposing a pair of polarizers, which is provided in a substantial crossed Nicol arrangement, on the outside of the respective substrates. With one of the polarizers, let it be assumed that its absorption axis is disposed at an angle of substantially 45° (degrees) relative to the direction of the alignment treatment that was performed to one substrate. When the liquid crystal layer is formed using a liquid crystal material having a negative dielectric constant anisotropy, and a voltage that is not less than a threshold voltage is applied between the electrodes of the respective substrates, most of the liquid crystal molecules in the liquid crystal layer become inclined in the horizontal alignment direction according to the direction of the alignment treatment. On observing this liquid crystal display device, a light display state is favorably observed from the 6 o'clock direction, and, contrarily, a light display state is not observed from the 12 o'clock direction. The 6 o'clock direction in the foregoing case is referred to as the optimal viewing direction (optimal viewing orientation), and the 12 o'clock direction is referred to as the anti-viewing direction (anti-viewing orientation).

In the foregoing vertical alignment liquid crystal display device, on observing the liquid crystal display device from the anti-viewing direction in a state where the liquid crystal display device is in a light display state when viewed from the front, a substantially dark state can be observed within the pixels, but light leakage occurs in the vicinity of one edge among the four pixel edges of the rectangular pixel. This light leakage occurs without regularity and differs in the respective pixels, and considerably drops the display quality from the appearance.

Moreover, in the foregoing vertical alignment liquid crystal display device, there are cases where a dark region appears in the respective pixels in a state where the liquid crystal display device is in a light display state when viewed from the front during multiplex driving, causing the display quality to drop. Since this phenomenon becomes more notable when the frame frequency is reduced, it is necessary to set the driving frequency higher in order to eliminate this phenomenon. Nevertheless, if the driving frequency is increased, the impedance between the electrodes will also increase, which causes the consumption current to increase and the load of the drive unit to increase, the potential difference of the electrodes will also become obvious, and cause the display quality to drop. Specifically, so-called crosstalk is more easily generated.

SUMMARY OF THE INVENTION

An object of a specific mode of the present invention is to improve the display quality of a vertical alignment liquid crystal display device that is driven by multiplex driving, by homogenizing the light leakage near the edges of the respective pixels on observing the display from an anti-viewing direction.

Another object of a specific mode of the present invention is to improve the display quality of a vertical alignment liquid crystal display device that is driven by multiplex driving, by homogenizing the light leakage near the edges of the respective pixels on observing the display from an anti-viewing direction, as well as to achieve the display uniformity when viewed from the front with the lowest possible frame frequency.

The liquid crystal display device according to a specific mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction that is substantially orthogonal to the first direction, and (d) a substantially vertically-aligned liquid crystal layer provided mutually between the one surface of the first substrate and the one surface of the second substrate, (e) wherein a pixel is configured in a region where the first electrode and the second electrode intersect, (f)

wherein alignment treatment is performed to at least the first substrate or the second substrate in a direction that is substantially parallel to the first direction, (g) wherein the first electrode is of a linear shape in which electrode edges on either side extend in the first direction, (h) wherein the second electrode is of a broken curve shape in which an electrode edge of at least one side includes a line segment which obliquely crosses the first direction, and (i) wherein, with the pixel, pixel edges are demarcated including the obliquely crossing line segments. The expression "obliquely crossing" as used in this specification refers to the oblique crossing at an angle other than orthogonal.

According to the foregoing configuration, since the pixel edges are demarcated on including the line segments that are obliquely crossed relative to the direction of the alignment treatment, it is possible to homogenize the light leakage near the edges of the respective pixels on observing the liquid crystal display device from an anti-viewing direction, and improve the display quality.

The above-described obliquely crossing line segments are preferably obliquely crossed by forming an angle that is from greater than 0° (degree) to 15° (degrees) or below with reference to the second direction.

The above-described obliquely crossing line segments are preferably configured by connecting a first straight line and a second straight line extending in mutually different directions. In this case, when lengths projected in the first direction are respectively Xa and Xb, the first straight line and the second straight line are of a relationship where Xa is three times Xb or more, and the first straight line is inclined by forming an angle that is from greater than 0° (degree) to 15° (degrees) or below with reference to the second direction.

Moreover, the above-described obliquely crossing line segments are preferably configured by connecting a first straight line and a second straight line in which their mutual lengths are substantially equal and which extend in mutually different directions. In this case, the first straight line and the second straight line are obliquely crossed by respectively forming an angle that is from greater than 0° (degree) to 15° (degrees) or below with reference to the second direction.

The above-described obliquely crossing line segments are preferably disposed on a side in an anti-viewing direction among the pixel edges.

The liquid crystal display device according to other mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction that is substantially orthogonal to the first direction, and (d) a substantially vertically-aligned liquid crystal layer provided mutually between the one surface of the first substrate and the one surface of the second substrate, wherein (e) a pixel is configured in a region where the first electrode and the second electrode intersect, wherein (f) alignment treatment is performed to at least the first substrate or the second substrate in one direction, wherein (g) respective pixel edges of the first electrode obliquely cross each other in a second direction, face mutually different directions, and are of a broken curve shape including two first line segments which are mutually connected and have substantially the same length, wherein (h) respective pixel edges of the second electrode obliquely cross each other in a first direction, face mutually different directions, and are of a broken curve shape including two second line segments which are mutually connected and have substantially the same length, and wherein, (i) with the pixel, the pixel edges are demarcated by the two first line segments and the two second line segments.

According to the foregoing configuration, since the pixel edges are demarcated on including the line segments that are obliquely crossed relative to the direction of the alignment treatment, it is possible to homogenize the light leakage near the edges of the respective pixels on observing the liquid crystal display device from an anti-viewing direction, and improve the display quality. Moreover, since all pixel edges become obliquely crossed in both the first direction and the second direction, an effect is yielded in that the frame frequency capable of achieving display uniformity when viewed from the front can be reduced.

The two first line segments are preferably respectively obliquely crossed by forming an angle that is from greater than 0° (degree) to 15° (degrees) or below with reference to the first direction.

Moreover, the first electrode is preferably of a shape where the respective pixel edges of one side and the other side are of an equal shape. It is thereby possible to improve the area efficiency on arranging a plurality of first electrodes.

The two second line segments are preferably respectively obliquely crossed by forming an angle that is from greater than 0° (degree) to 15° (degrees) or below with reference to the second direction.

Moreover, the second electrode is preferably of a shape where the respective pixel edges of one side and the other side are of an equal shape. It is thereby possible to improve the area efficiency on arranging a plurality of first electrodes.

The liquid crystal display device according to other mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction that is substantially orthogonal to the first direction, and (d) a substantially vertically-aligned liquid crystal layer provided mutually between the one surface of the first substrate and the one surface of the second substrate, wherein (e) a pixel is configured in a region where the first electrode and the second electrode intersect, wherein (f) alignment treatment is performed to at least the first substrate or the second substrate in a direction that is substantially parallel to the first direction, wherein (g) the first electrode is of a linear shape in which electrode edges on either side extend in the first direction, and has one or more rectangular openings which are long in the first direction, wherein (h) the second electrode is of a broken curve shape in which an electrode edge of at least one side includes a line segment which obliquely crosses the first direction, wherein, (i) with the pixel, the pixel edges are demarcated by the obliquely crossing line segments of the electrode edge of the first electrode and the pixel edge of the second electrode, and wherein (j) the opening is disposed so as to overlap with the pixel.

According to the foregoing configuration, since the pixel edges are demarcated on including the line segments that are obliquely crossed relative to the direction of the alignment treatment, it is possible to homogenize the light leakage near the edges of the respective pixels on observing the liquid crystal display device from an anti-viewing direction, and improve the display quality. Moreover, as a result of providing one or more rectangular openings which overlaps with the pixel, an effect is yielded in that the frame frequency capable of achieving display uniformity when viewed from the front can be reduced.

In the foregoing liquid crystal display device, preferably, the obliquely crossing line segments are obliquely crossed by forming an angle that is from greater than 0° (degree) to 15° (degrees) or below with reference to the first direction.

In the foregoing liquid crystal display device, preferably, the openings are disposed so that the longitudinal direction is parallel to the first direction.

In the foregoing liquid crystal display device, preferably, the openings are disposed so that the longitudinal direction is inclined relative to the first direction. In the foregoing case, preferably, the opening is disposed so that the longitudinal direction is substantially orthogonal to the obliquely crossing line segments.

The liquid crystal display device according to other mode of the present invention comprises (a) a first substrate and a second substrate placed opposite each other, (b) a first electrode provided on one surface of the first substrate and which extends in a first direction, (c) a second electrode provided on one surface of the second substrate and which extends in a second direction that is substantially orthogonal to the first direction, and (d) a substantially vertically-aligned liquid crystal layer provided mutually between the one surface of the first substrate and the one surface of the second substrate, wherein (e) a pixel is configured in a region where the first electrode and the second electrode intersect, wherein (f) alignment treatment is performed to at least the first substrate or the second substrate in a direction that is substantially parallel to the first direction, wherein (g) the first electrode is of a linear shape in which electrode edges on either side extend in the first direction, wherein (h) the second electrode is of a broken curve shape in which an electrode edge of at least one side includes a line segment which obliquely crosses the first direction, wherein (i) an electrode width of the first electrode is smaller than an electrode width of the second electrode, wherein, (j) with the pixel, the pixel edges are demarcated by the obliquely crossing line segments of the electrode edge of the first electrode and the pixel edge of the second electrode, and wherein (k) the pixel edges are formed in a long shape along the first direction.

According to the foregoing configuration, since the pixel edges are demarcated on including the line segments that are obliquely crossed relative to the direction of the alignment treatment, it is possible to homogenize the light leakage near the edges of the respective pixels on observing the liquid crystal display device from an anti-viewing direction, and improve the display quality. Moreover, by causing the electrode width of the first electrode to be relatively small and forming the pixel edges into a long shape along the first direction, an effect is yielded in that the frame frequency capable of achieving display uniformity when viewed from the front can be reduced.

In the foregoing liquid crystal display device, for example, the second electrode is preferably of a structure in which the electrode edges on either side are of substantially the same shape and the electrode width is substantially fixed, and the pixel edges are a substantial parallelogram that is long along the first direction.

In the foregoing liquid crystal display device, for example, the second electrode is preferably of a structure in which the spot where the inflection point of the electrode edge on one side and the inflection point of the electrode edge on the other side are relatively close and the spot where they are relatively apart are alternated repeatedly, and the pixel edges are of a trapezoidal shape that is long along the first direction.

In the foregoing liquid crystal display device, the electrode width of the first electrode is preferably substantially ½ or less of the electrode width of the second electrode.

BRIEF DESCRIPTION OF THE DRAWINGS

FIGS. 5A and 5B are schematic plan views showing an example of type D electrode structure.

FIGS. 6A and 6B are schematic plan views showing an example of type E electrode structure.

FIGS. 9A, 9B and 9C are diagrams showing the alignment texture observed image during voltage application of the liquid crystal display device having the type A electrode structure.

FIG. 10 is a diagram showing the alignment texture observed image during voltage application of the liquid crystal display device having the type B electrode structure.

FIG. 11 is a diagram showing the alignment texture observed image during voltage application of the liquid crystal display device having the type C electrode structure.

FIGS. 12A, 12B and 12C are diagrams showing the alignment texture observed image during voltage application of the liquid crystal display device having the type D electrode structure.

FIG. 13 is a diagram showing the alignment texture observed image during voltage application of the liquid crystal display device having the type E electrode structure, where θ (theta) is 10° (degrees).

FIG. 14 is a diagram showing the alignment texture observed image during voltage application of the liquid crystal display device having the type G electrode structure, where θ (theta) is 10° (degrees).

FIGS. 15A and 15B are schematic plan views showing another example of the type H electrode structure.

FIG. 24 is a diagram showing other example of the electrode structure.

FIG. 25A is a diagram showing the alignment texture observed image during voltage application when θ (theta) is set to 10° (degrees) in the type D electrode structure.

FIG. 25B is a diagram showing the alignment texture observed image during voltage application when θ (theta) is set to 10° (degrees) in the type E electrode structure.

FIG. 25C is a diagram showing the alignment texture observed image during voltage application when θ (theta) is set to 10° (degrees) in the type G electrode structure.

FIGS. 28A and 28B are schematic plan views showing an example of the electrode structure.

FIGS. 29A and 29B are other schematic plan views showing an example of the electrode structure.

FIGS. 30A and 30B are other schematic plan views showing an example of the electrode structure.

FIGS. 31A and 31B are other schematic plan views showing an example of the electrode structure.

DESCRIPTION OF THE PREFERRED EMBODIMENTS

Figure 34:
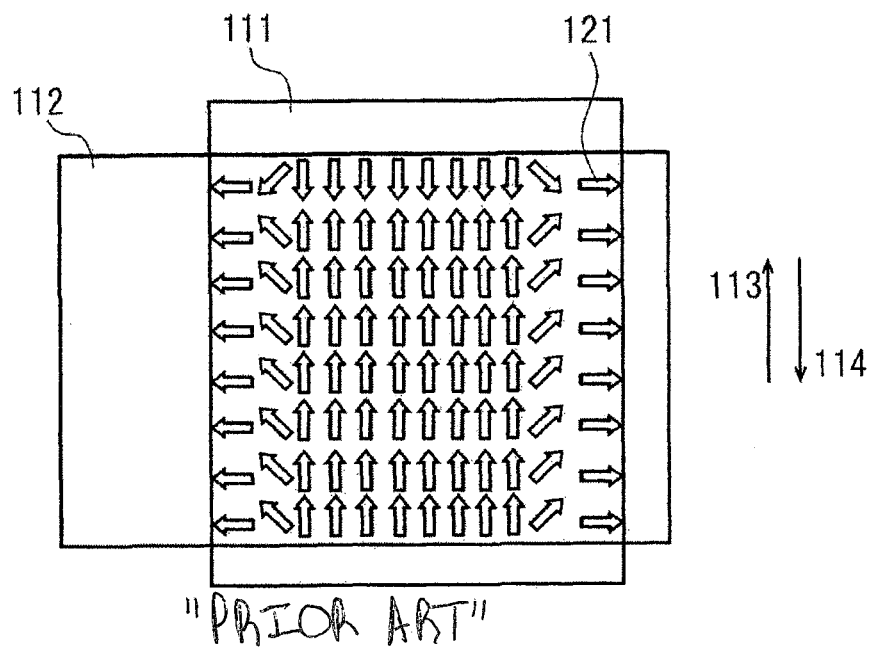
FIG. 34 is a plan view schematically showing the director of the liquid crystal molecules at the substantial center of the liquid crystal layer during voltage application in one rectangular pixel which is obtained by intersecting strip-shaped electrodes.

The present inventors studied the cause of light leakage that occurs in the vicinity of the pixel edges of the respective pixels under driving a vertical alignment liquid crystal display device by multiplex driving. FIG. 34 is a plan view schematically showing the director(alignment direction) of the liquid crystal molecules at the substantial center of the liquid crystal layer during voltage application in one rectangular pixel which is obtained by intersecting strip-shaped electrodes. Note that, in FIG. 34, the upward direction corresponds to the 12 o'clock direction in the liquid crystal display device, the longitudinal direction corresponds respectively to the 9 o'clock direction and the 3 o'clock direction, and the downward direction corresponds to the 6 o'clock direction, and let it be assumed that the downward direction is the optimal viewing direction. The pixel shown in FIG. 34 is formed by intersecting a strip-shaped electrode 111 and a strip-shaped electrode 112. The strip-shaped electrode 111 is provided to a first substrate not shown, and the strip-shaped electrode 112 is provided to a second substrate which is not shown. The direction 114 of the alignment treatment performed to the first substrate is the 6 o'clock direction, and the direction 113 of the alignment treatment performed to the second substrate is the 12 o'clock direction. In the vicinity of the pixel edges of the 12 o'clock direction as the anti-viewing direction, since the alignment direction during the non-application of voltage and the alignment direction that is prescribed by the generation of a fringe electric field differ by 180° (degrees), rotation of the alignment direction 121 of the liquid crystal molecules will occur in this vicinity. Meanwhile, even in the vicinity of the respective pixel edges of the longitudinal direction, since the fringe electric field differs from the alignment direction during the non-application of voltage by 90° (degrees), rotation of the alignment direction 121 will also occur. On the assumption that the respective absorption axes of the polarizers in a crossed Nicol arrangement are respectively disposed substantially 45° (degrees) relative to the alignment direction during the non-application of voltage, it is anticipated that a light display state cannot be achieved even if voltage is applied to a region that is parallel thereto. Moreover, since a region of a different alignment direction 121 during voltage application is generated in the vicinity of the three pixel edges; namely, the left, right and upper pixel edges, this liquid crystal display device takes on a multi-domain alignment during voltage application. Accordingly, the optimal viewing direction is different in the vicinity of the respective pixel edges, and in particular a region that is subject to light leakage can be visually confirmed on observing the liquid crystal display device from the 12 o'clock direction, which is the anti-viewing direction.

Figure 35:
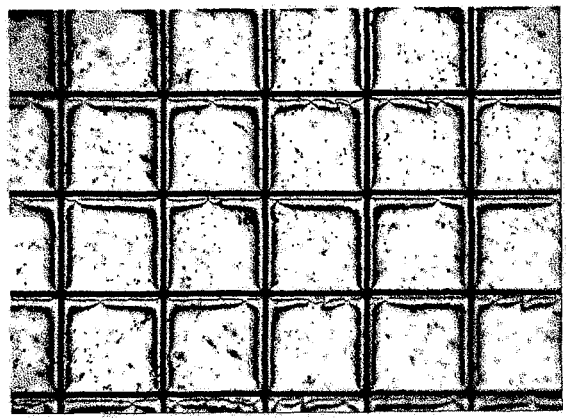
FIG. 35 is a diagram showing the polarizing microscopic image of the pixels during voltage application of a liquid crystal display device of a conventional type, which was actually manufactured.

FIG. 35 is a diagram showing the polarizing microscopic image of the pixels during voltage application of a liquid crystal display device of a conventional type (hereinafter referred to as the conventional liquid crystal display device) which was actually manufactured. With this liquid crystal display device, one pixel is a 0.43 mm square, and the electrode spacing of the strip-shaped electrodes is 30 micro meters. On observing the inside of one pixel, a crossed-shaped dark region can be observed. As described above, since the rotation of the alignment direction of the liquid crystal molecules has occurred due to the influence of the fringe electric field in the vicinity of the pixel edges during voltage application, in the vicinity of this dark region, the alignment direction is approximate to a direction that is parallel to or a direction that is orthogonal to the absorption axis of the polarizer. In particular, in the vicinity of the pixel edge of the 12 o'clock direction with a large rotation angle of the alignment direction of the liquid crystal molecules at the substantial center of the liquid crystal layer, a condition where the dark region is considerably penetrating into the pixel from the pixel edge can be observed. Moreover, a cross point of the dark region can be observed in the vicinity of this pixel edge. This cross point is considered to be a disclination that is retained in a substantial vertical alignment even though voltage is applied to the liquid crystal molecules. On observing the respective pixels, there are cases where there is one or three cross point(s), and the generation status of the cross points is irregular. In addition, the shape of the cross-shaped dark region differs completely depending on the pixel. If the shape of this dark region is not uniform, there will be a difference in the area ratio of the respective domains in the multi-domain alignment, and this is considered to result in the difference of viewing angle characteristics. In other words, this is considered to be the cause of display non-uniformity in the anti-viewing direction.

Thus, on further observing the microscopic image of FIG. 35 in detail, it was discovered that the vicinity of the pixel edge of the 12 o'clock direction accounted for most of the irregularity of the shape of the dark region in the respective pixels. In this region, the electrode edge of the strip-shaped electrode 112 and the directions 113, 114 of the respective alignment treatments are substantially orthogonal. Meanwhile, in the vicinity of the respective pixel edges of the 9 o'clock direction and the 3 o'clock direction where a dark region similarly appears, the dark region appears with regularity in the respective pixels. In this region, the electrode edge of the strip-shaped electrode 111 and the directions 113, 114 of the respective alignment treatments are substantially parallel. Consequently, by further reducing the site where the pixel edge and the alignment treatment direction are orthogonal, it is considered that the display quality can be improved by causing the shape of the dark region that appears in the respective pixels to be uniform.

Figure 36:
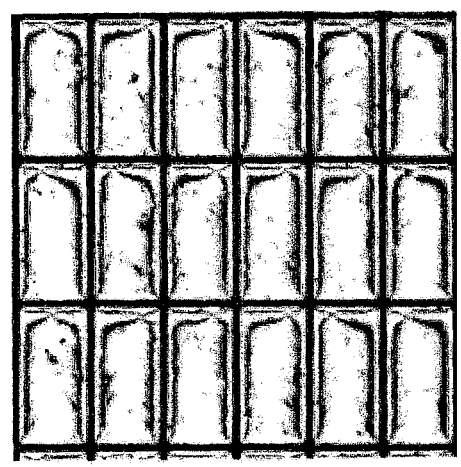
FIG. 36 is a diagram showing the alignment texture during the light display state of the liquid crystal display device in which the electrode width of one strip-shaped electrode was narrowed.

Meanwhile, in the case of driving the conventional liquid crystal display device shown in FIG. 35 by multiplex driving based on 1/64 duty, 1/9 bias and a frame inverted waveform to achieve a light display state, on examining the lower limit of the frame frequency capable of obtaining display uniformity when the device is viewed from the front, the frame frequency was 105 Hz. Meanwhile, on examining methods of further reducing the lower limit of the frame frequency, it was discovered that relatively narrowing the electrode width of one strip-shaped electrode is effective. Specifically, while the electrode width of the respective strip-shaped electrodes was 0.4 mm in the conventional liquid crystal display device shown in FIG. 35, a liquid crystal display device in which the electrode width of one strip-shaped electrode (segment electrode) was reduced to 0.185 mm was prepared, and driven by multiplex driving under the same conditions as those described above. In the foregoing case, the lower limit of the frame frequency capable of obtaining display uniformity when viewed from the front in the case of a light display state was 85 Hz. The display state on externally observing this liquid crystal display device from the anti-viewing direction had improved in its display uniformity in comparison to the liquid crystal display device shown in FIG. 35, but it was still insufficient. FIG. 36 is a diagram showing the alignment texture during the light display state of the liquid crystal display device in which the electrode width of one strip-shaped electrode was narrowed. Each pixel is of a rectangular shape, but it can be seen that the dark region which is generated at the edge of the 12 o'clock direction among the four edges has no regularity in the respective pixels. In addition, it was also confirmed that the uniformity of the dark region that is generated in the respective edges of the 3 o'clock direction and the 9 o'clock direction is also insufficient. Thus, it seems that it is difficult to ensure the display uniformity on viewing the liquid crystal display device from the anti-viewing direction.

Thus, on further examining the microscopic images of FIG. 35 and FIG. 36 in detail, it was discovered that the vicinity of the pixel edge of the 12 o'clock direction accounted for most of the irregularity of the shape of the dark region in the respective pixels. In this region, the electrode edge of the strip-shaped electrode 112 and the directions 113, 114 of the respective alignment treatments are substantially orthogonal. Meanwhile, in the vicinity of the respective pixel edges of the 9 o'clock direction and the 3 o'clock direction where a dark region similarly appears, the dark region appears with regularity in the respective pixels. In this region, the electrode edge of the strip-shaped electrode 111 and the directions 113, 114 of the respective alignment treatments are substantially parallel. Consequently, by further reducing the site where the pixel edge and the alignment treatment direction are orthogonal, it is considered that the display quality can be improved by causing the shape of the dark region that appears in the respective pixels to be uniform.

Embodiments of the present invention based on the foregoing discovery are now explained.

(First Embodiment)

Figure 1:
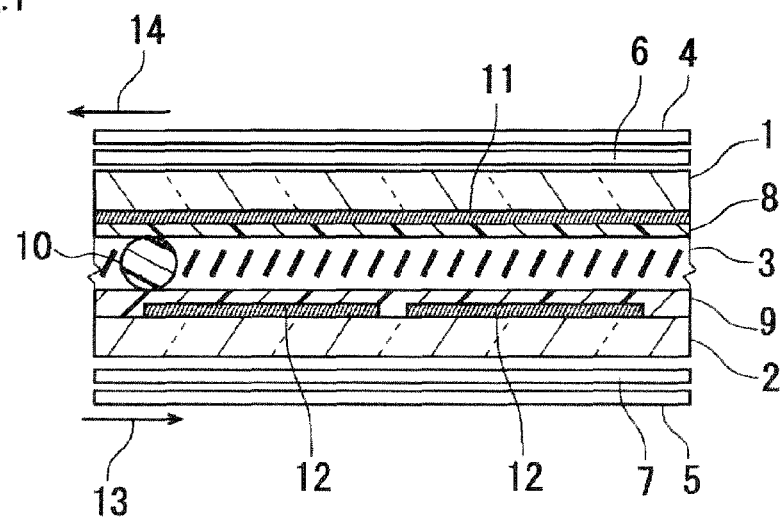
FIG. 1 is a schematic cross section showing the structure of the liquid crystal display device according to one embodiment of the present invention.

FIG. 1 is a schematic cross section showing the structure of the liquid crystal display device according to one embodiment of the present invention. The liquid crystal display device of this embodiment shown in FIG. 1 mainly comprises a first substrate 1 and a second substrate 2 placed opposite each other and a liquid crystal layer 3 provided between both substrates. A first polarizer 4 is disposed outside the first substrate 1, and a second polarizer 5 is disposed outside the second substrate 2. A first viewing angle compensator 6 is disposed between the first substrate 1 and the first polarizer 4, and a second viewing angle compensator 7 is disposed between the second substrate 2 and the second polarizer 5. The periphery of the liquid crystal layer 3 is sealed with a sealant which is not shown in FIG. 1. The structure of the liquid crystal display device is now explained in further detail.

The first substrate 1 and the second substrate 2 are respectively, for example, transparent substrates such as glass substrates or plastic substrates. Spacers (sphere materials) 10 are dispersed and disposed between the first substrate 1 and the second substrate 2. As a result of these spacers 10, the gap between the first substrate 1 and the second substrate 2 is maintained at a predetermined distance (in this embodiment, approximately 4.3 micrometers).

The liquid crystal layer 3 is provided mutually between the first electrode 11 of the first substrate 1 and the second electrode 12 of the second substrate 2. In this embodiment, the liquid crystal layer 3 is configured by using a liquid crystal material (nematic liquid crystal material) in which the dielectric anisotropy $\Delta\epsilon$ (delta epsilon) is negative ($\Delta\epsilon$ (delta epsilon)<0). Bold lines illustrated in the liquid crystal layer 3 schematically show the director of the liquid crystal molecules during the non-application of voltage. As shown in the diagram, with the liquid crystal display device of this embodiment, the alignment state of the liquid crystal molecules in the liquid crystal layer 3 is oriented by a mono-domain alignment. The pretilt angle in the liquid crystal layer 3 in this embodiment is generally set to 89.9° (degrees). Moreover, retardation of the liquid crystal layer 3 is approximately 1100 nm (nanometer).

The polarizer 4 and the polarizer 5 are disposed so that their respective absorption axes are mutually substantially orthogonal (crossed Nicol arrangement). Moreover, the polarizer 4 and the polarizer 5 are disposed so that their respective absorption axes form an angle of substantially 45° (degrees) with both the direction 14 of the alignment treatment performed to the first substrate and the direction 13 of the alignment treatment performed to the second substrate. Consequently, the absorption axes of the respective polarizers 4, 5 form an angle of substantially 45° (degrees) relative to the alignment direction of the liquid crystal layer at the substantial center of the liquid crystal layer 3 that is defined by the directions 13, 14 of the respective alignment treatments.

An alignment film 8 is provided to one surface side of the first substrate 1 so as to cover the first electrode 11. Similarly, an alignment film 9 is provided to one surface side of the second substrate 2 so as to cover the second electrode 12. Alignment treatment such as rubbing treatment is performed on the surface of the respective alignment films 8,9. The direction 14 of the alignment treatment performed to the alignment film 8 is as shown in the diagram, and basically coincides with the extending direction (first direction) of the first electrode 11. Moreover, the direction 13 of the alignment treatment performed to the alignment film 9 is as shown in the diagram, and basically coincides with the extending direction (second direction) of the second electrode 12. In this embodiment, as the alignment film 8 and the alignment film 9, used is a film (vertical alignment film) for controlling the alignment state of the liquid crystal layer 3 in its initial state (during non-application of voltage) to a vertically aligned state. More specifically, as the respective alignment films 8, 9, used is a film that is capable of forming a pretilt angle that is extremely close to 90° (degrees) relative to the liquid crystal molecules of the liquid crystal layer 3.

The first electrode 11 is provided to one surface side of the first substrate 1. Similarly, the second electrode 12 is provided to one surface side of the second substrate 2. In this embodiment, a plurality of first electrodes 11 and a plurality of second electrodes 12 respectively extending in specific directions are placed opposite each other by causing their respective extending directions to be substantially orthogonal. The first electrode 11 and the second electrode 12 is configured respectively, for example, by patterning a transparent conductive film made of indium tin oxide (ITO) or the like as needed. With the liquid crystal display device of this embodiment, the respective overlapping portions of the first electrode 11 and the second electrode 12 in a planar view become the pixel.

In this embodiment, by causing the electrode edge of the respective second electrodes 12 to be a broken curve shape including a line segment which obliquely crosses the extending direction (first direction) of the first electrode, a structure is achieved where the pixel edge of the portion that is demarcated by the electrode edge of the respective second electrodes 12 among the respective pixels and the directions 13, 14 of the respective alignment treatment are not orthogonal. Some specific structures are described below.

Figure 2A:
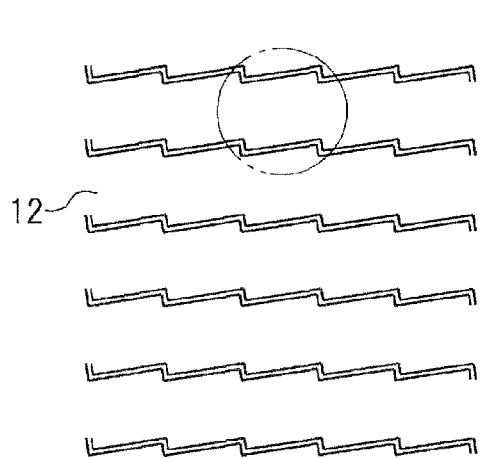
FIGS. 2A and 2B are schematic plan views showing an example of type A electrode structure.
Figure 2B:
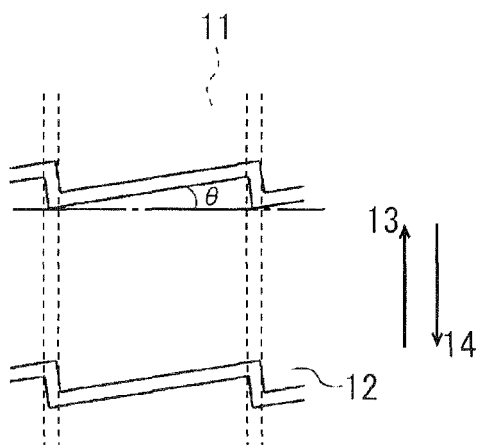

FIGS. 2A and 2B are schematic plan views showing an example of the electrode structure. As shown in FIG. 2A, the electrode edge of the respective second electrodes 12 extending in the longitudinal direction in the diagram is formed in a saw teeth shape, and one pitch of the saw teeth basically coincides with the electrode width of the respective first electrodes 11. An enlarged view of the electrode portion corresponding to one pixel is shown in FIG. 2B. In FIG. 2B, the respective first electrodes 11 extending in the vertical direction in the diagram are shown with a dotted line (the same applies in FIGS. 3A and 3B onward). Since the regions where the respective first electrodes 11 and the respective second electrodes 12 intersect become one pixel, respectively, the shape of one pixel becomes a substantial parallelogram that is demarcated by two electrode edges of the first electrode 11 and two electrode edges of the second electrode 12, and the shape of all pixels becomes equal. In the ensuing explanation, the electrode structure shown in FIGS. 2A and 2B is also referred to as the "type A electrode structure". Note that, when the electrode spacing of the respective first electrodes 11 and second electrodes 12 is wide, the shape of one pixel becomes a substantial hexagonal shape.

When the angle formed by the electrode edge of the saw teeth-shaped second electrode 12 and the horizontal direction (longitudinal direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. Note that, although the electrode edge of the second electrode 12 shown in FIG. FIGS. 2A and 2B 2 is of a saw teeth shape rising to the right, it is considered that the same effect can be yielded with a saw teeth shape falling to the right.

Figure 3A:
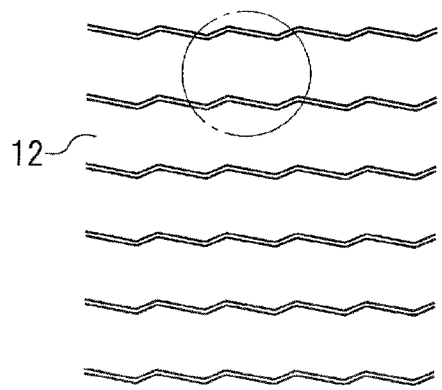
FIGS. 3A and 3B are schematic plan views showing an example of type B electrode structure.
Figure 3B:
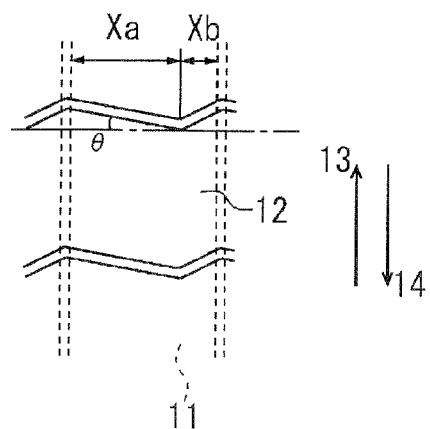

FIGS. 3A and 3B are schematic plan views showing other example of the electrode structure. As shown in FIG. 3A, although the electrode edge of the respective second electrodes 12 extending in the longitudinal direction in the diagram is formed in a saw teeth shape, unlike the structure shown in FIGS. 2A and 2B, one pitch of the saw teeth does not coincide with the electrode width of the respective first electrodes 11. In addition, as shown in FIG. 3B, with the respective second electrodes 12, the downward apex angle portion of the saw teeth and the space between the first electrodes 11 do not overlap. The respective upper and lower electrode edges in one pixel are of a shape in which two edges (first straight line and second straight line) with different inclination directions are connected. When the length components (projected lengths) that are parallel to the longitudinal direction regarding the respective electrode edges are Xa and Xb, the total length of Xa and Xb and the electrode width of the respective first electrodes 11 are set to be approximately equal. In addition, the respective first electrodes 11 and the respective second electrodes 12 are disposed so that both ends of the electrode edge that is formed by connecting two edges with different inclination directions and the space between the first electrodes 11 overlap. In the ensuing explanation, the electrode structure shown in FIGS. 3A and 3B is also referred to as the "type B electrode structure". It could also be said that the foregoing type A electrode structure is a special case where Xa=0 in the type B electrode structure.

In the type B electrode structure, Xa>Xb, and, preferably, Xa is set to be less than 4 times (more preferably less than 3 times) Xb. When the angle formed by an edge having the length component Xa and the horizontal direction is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. The shape of the respective pixels in the type B electrode structure is a deformed "dog-leg" hexagonal shape, and the shape of all pixels is the same. Note that, with the electrode edge of the second electrode 12 shown in FIGS. 3A and 3B, although the left edge (edge rising to the right) is set to be relatively long and the right edge (edge falling to the right) is set to be relatively short, it is considered that the same effect can be yielded when this is inverted horizontally.

Figure 4A:
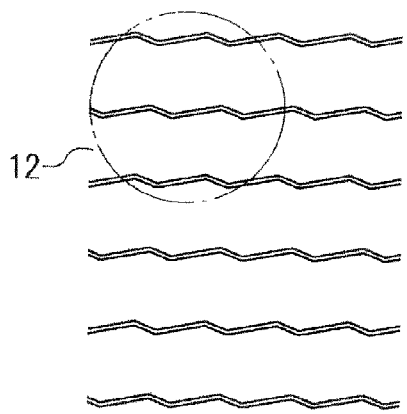
FIGS. 4A and 4B are schematic plan views showing an example of type C electrode structure.
Figure 4B:
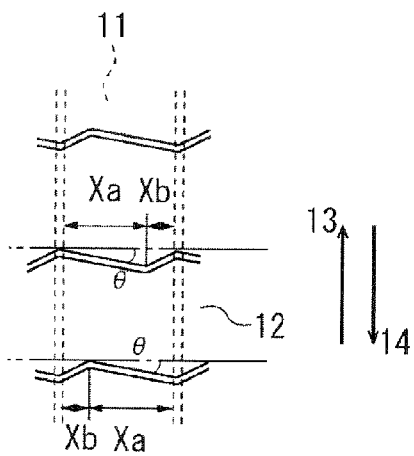

FIGS. 4A and 4B are schematic plan views showing other example of the electrode structure. As shown in FIG. 4A, although the electrode edge of the respective second electrodes 12 extending in the longitudinal direction in the diagram is formed in a saw teeth shape, unlike the structure shown in FIGS. 2A and 2B, one pitch of the saw teeth does not coincide with the electrode width of the respective first electrodes 11. In addition, as shown in FIG. 4B, with the respective second electrodes 12, one apex angle portion of the saw teeth and the space between the first electrodes 11 do not overlap. The respective upper and lower electrode edges in one pixel are of a shape in which two edges with different inclination directions are connected. As with the type B electrode structure described above, when the length components that are parallel to the longitudinal direction regarding the respective electrode edges are Xa and Xb, the total length of Xa and Xb and the electrode width of the respective first electrodes 11 are set to be approximately equal. In addition, the respective first electrodes 11 and the respective second electrodes 12 are disposed so that both ends of the electrode edge that is formed by connecting two edges with different inclination directions and the space between the first electrodes 11 overlap. In the ensuing explanation, the electrode structure shown in FIGS. 4A and 4B is also referred to as the "type C electrode structure".

The difference between the type C electrode structure and the type B electrode structure is that in type C electrode structure, the apexes of the saw teeth in both electrode edges of the respective second electrode 12 are irregular. In the illustrated example, one apex of the saw teeth is arranged so that it is displaced by substantially Xb in the longitudinal direction relative to the other apex. Note that the amount of displacement is not limited to Xb. In the type C electrode structure also, Xa>Xb, and, preferably, Xa is set to be less than 4 times (more preferably less than 3 times) Xb. When the angle formed by an edge having the length component Xa and the horizontal direction is defined as θ (theta), this angle θ (theta) is set to be from greater than 0° (degree) to 15° (degrees) or below. It is thereby possible to realize a structure where the two edges; namely, the upper and lower edges of the respective pixels and the directions 13, 14 of the respective alignment treatments are not orthogonal. The shape of the respective pixels in the type C electrode structure is a deformed hexagonal shape, the shape of the pixels that are adjacent in the vertical direction is different, and the difference in shape is repeated for every other second electrode 12. Note that, as with the case of the type B electrode structure, it is considered that the same effect can be yielded when the pixel shape is configured to be inverted horizontally.

FIGS. 5A and 5B are schematic plan views showing other example of the electrode structure. As shown in FIG. 5A, the electrode edge of the respective second electrodes 12 extending in the longitudinal direction in the diagram is formed in a saw teeth shape, and ½ pitch of the saw teeth basically coincides with the electrode width of the respective first electrodes 11. In addition, as shown in FIG. 5B, the respective second electrodes 12 are disposed in a state where one apex angle portion (inflection point) of the saw teeth overlaps with the space between the first electrodes 11. Since the regions where the respective first electrodes 11 and the respective second electrodes 12 intersect become one pixel, respectively, the shape of one pixel becomes a substantial parallelogram, that is demarcated by two electrode edges of the first electrode 11 and two electrode edges of the second electrode 12. In the ensuing explanation, the electrode structure shown in FIGS. 5A and 5B is also referred to as the "type D electrode structure".

In FIGS. 5A and 5B, when the angle formed by the electrode edge of the saw teeth-shaped second electrode 12 and the horizontal direction (longitudinal direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. With the respective pixels in the type D electrode structure, the pixels that are adjacent in the vertical direction are of the same shape, but the shape of the pixels that are adjacent in the longitudinal direction is different, and the difference in shape is repeated for every other first electrode 11.

FIGS. 6A and 6B are schematic plan views showing other example of the electrode structure. As shown in FIG. 6A, the electrode edge of the respective second electrodes 12 extending in the longitudinal direction in the diagram is formed in a saw teeth shape, and one pitch of the saw teeth basically coincides with the electrode width of the respective first electrodes 11. The difference with the type D electrode structure shown in FIGS. 5A and 5B is that in this example, the inflective directions are mutually different at the one electrode edge and the other electrode edge of the respective second electrodes 12, and the inflectional apexes of both electrode edges repeatedly approach each other and separate from each other. In addition, as shown in FIG. 6B, the respective second electrodes 12 are disposed in a state where one apex angle portion (inflection point) of the saw teeth overlaps with the space between the first electrodes 11. Since the regions where the respective first electrodes 11 and the respective second electrodes 12 intersect become one pixel, respectively, the shape of one pixel becomes a substantial trapezoidal shape that is demarcated by two electrode edges of the first electrode 11 and two electrode edges of the second electrode 12. In the ensuing explanation, the electrode structure shown in FIGS. 6A and 6B is also referred to as the "type E electrode structure".

In FIGS. 6A and 6B, when the angle formed by the electrode edge of the saw teeth-shaped second electrode 12 and the horizontal direction (longitudinal direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. With respective pixels in the type E electrode structure, the shape of pixels that are adjacent in the vertical direction and the shape of the pixels that are adjacent in the longitudinal direction are both different, and the difference in shape is repeated for every other first electrode 11, and every other second electrode 12.

Figure 7A:
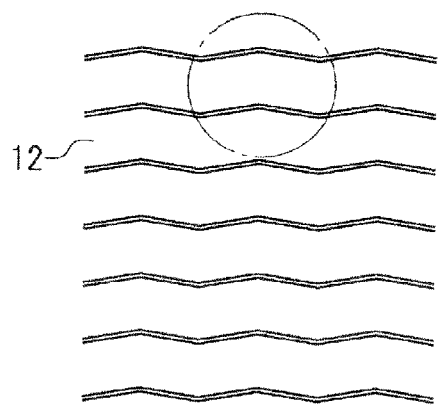
FIGS. 7A and 7B are schematic plan views showing an example of type F electrode structure.
Figure 7B:
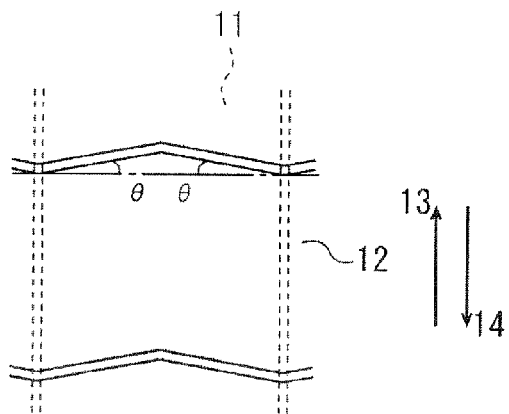

FIGS. 7A and 7B are schematic plan views showing other example of the electrode structure. As shown in FIG. 7A, the electrode edge of the respective second electrodes 12 extending in the longitudinal direction in the diagram is formed in a saw teeth shape, and one pitch of the saw teeth basically coincides with the electrode width of the respective first electrodes 11. As shown in FIG. 7B, with the respective second electrodes 12, one apex angle portion (inflection point) of the saw teeth overlaps with the substantial center part of the first electrode 11, and the other apex angle portion (inflection point) is disposed to overlap with the space between the first electrodes 11. Since the regions where the respective first electrodes 11 and the respective second electrodes 12 intersect become one pixel, respectively, the shape of one pixel becomes a substantial inversed V-shaped hexagonal shape that is demarcated by two electrode edges of the first electrode 11 and two electrode edges of the second electrode 12. In the ensuing explanation, the electrode structure shown in FIGS. 7A and 7B is also referred to as the "type F electrode structure".

In FIGS. 7A and 7B, when the angle formed by the electrode edge of the saw teeth-shaped second electrode 12 and the horizontal direction (longitudinal direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. With the respective pixels in the type F electrode structure, the pixels that are adjacent in the vertical direction and the pixels that are adjacent in the longitudinal direction become the same shape in both cases. Note that the shape of the respective pixels can also be a substantial V-shaped hexagonal shape.

Figure 8A:
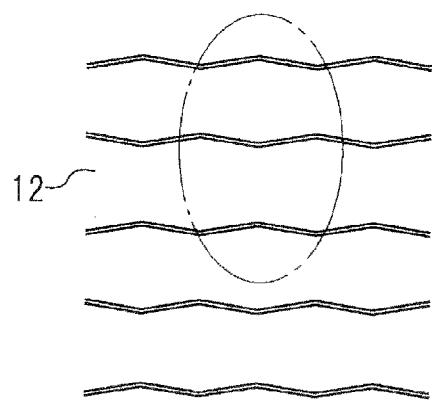
FIGS. 8A and 8B are schematic plan views showing an example of type G electrode structure.
Figure 8B:
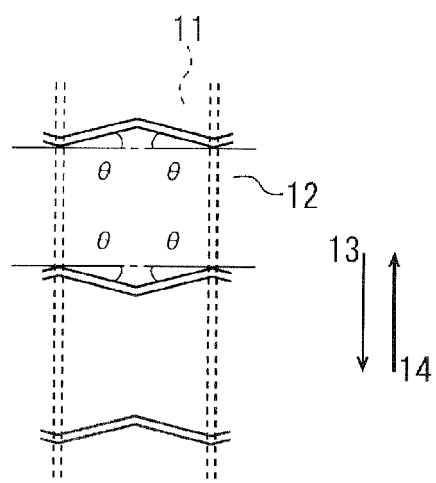

FIGS. 8A and 8B are schematic plan views showing other example of the electrode structure. As shown in FIG. 8A, the electrode edge of the respective second electrodes 12 extending in the longitudinal direction in the diagram is formed in a saw teeth shape, and one pitch of the saw teeth basically coincides with the electrode width of the respective first electrodes 11. The difference with the type F electrode structure shown in FIGS. 7A and 7B is that in this example, the inflective directions are mutually different at the one electrode edge and the other electrode edge of the respective second electrodes 12, and the inflection points of both electrode edges repeatedly approach each other and separate from each other. In addition, as shown in FIG. 8B, the respective second electrodes 12 are disposed in a state where one apex angle portion (inflection point) of the saw teeth overlaps with the substantial center part of the first electrode 11, and the other inflection point (apex) overlaps with the space between the first electrodes 11. Since the regions where the respective first electrodes 11 and the respective second electrodes 12 intersect become one pixel, respectively, the shape of one pixel becomes a substantial hexagonal shape that is demarcated by two electrode edges of the first electrode 11 and two electrode edges of the second electrode 12. In the ensuing explanation, the electrode structure shown in FIGS. 8A and 8B is also referred to as the "type G electrode structure".

In FIGS. 8A and 8B, when the angle formed by the electrode edge of the saw teeth-shaped second electrode 12 and the horizontal direction (longitudinal direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. With the respective pixels in the type G electrode structure, the shape of the pixels that are adjacent in the vertical direction is different, but the pixels that are adjacent in the longitudinal direction are of the same shape.

Next, liquid crystal display devices having the respective pixel structures of types A to G described above were actually prepared, and the results on performing alignment texture observations and appearance observations are now explained. In the actually prepared liquid crystal display devices, the specific numerical value conditions based on the type of each electrode structure were as follows. Note that, in all types, the distance between adjacent electrodes of the respective second electrode 12 was set to 0.03 mm so that the opening area would not drop. Moreover, with respect to the first electrode 11, the electrode arrangement pitch was set to 0.43 mm, and the distance between adjacent electrodes was set to 0.03 mm. The direction of the alignment treatment, the director of the liquid crystal molecules at the substantial center of the liquid crystal layer 3, and the status of arrangement of the respective polarizers were as described above.

(1) With respect to type A, the apex pitch of the saw teeth was set to 0.43 mm and θ (theta) was set to 5° (degrees), 10° (degrees), and 15° (degrees).

(2) With respect to type B, Xa=0.3225 mm, Xb=0.1075 mm, Xa+Xb=0.43 mm, and θ (theta) was set to 5° (degrees), 10° (degrees), and 15° (degrees).

(3) With respect to type C, Xa=0.3225 mm, Xb=0.1075 mm, Xa+Xb=0.43 mm, the displacement distance of the apex portion between both electrode edges was set to 0.1075 mm, and θ (theta) was set to 5° (degrees), 10° (degrees), and 15° (degrees).

(4) With respect to type D, the distance between adjacent inflection points was set to 0.43 mm, and θ (theta) was set to 5° (degrees), 10° (degrees), and 15° (degrees).

(5) With respect to type E, the setting was the same as type D.

(6) With respect to type F, the distance between adjacent inflection points was set to 0.215 mm, and θ (theta) was set to 5° (degrees), 10° (degrees), and 15° (degrees).

(7) With respect to type G, the setting was the same as type F.

FIGS. 9A, 9B and 9C are diagrams showing the alignment texture observed image during voltage application of the liquid crystal display device having the type A electrode structure. Specifically, FIG. 9A is an image where θ (theta)=5° (degrees), FIG. 9B is an image where θ (theta)=10° (degrees), and FIG. 9C is an image where θ (theta)=15° (degrees). As shown in the diagrams, the shape of the respective pixels is a substantial parallelogram or a deformed hexagonal shape. As with the conventional liquid crystal display device (refer to FIG. 35), since a dark region can be observed in the vicinity of the pixel edges of the respective pixels in these examples also, it is considered that the influence of the fringe electric field also exists in the vicinity of the pixel edges. Nevertheless, on comparing the dark regions of the respective pixels, they are basically of the same shape, and the uniformity of the dark regions is considerably improved in comparison to the conventional liquid crystal display device. In addition, on further observing the dependency on the angle θ (theta) in detail, the uniformity of the dark regions had improved more with θ (theta)=10° (degrees) and θ (theta)=15° (degrees) than when the angle θ (theta)=5° (degrees). As a result of externally observing the liquid crystal display devices of these examples from the anti-viewing direction, and at an angle of 70° (degrees) in the clockwise and counterclockwise direction from the center thereof, the display uniformity; that is, the uniformity of light leakage at the pixel edges had significantly improved in comparison to the conventional liquid crystal display device, and the significant improvement of the display quality was confirmed. The display uniformity was more superior when the angle θ (theta) was larger.

FIG. 10 is a diagram showing the alignment texture observed image during voltage application of the liquid crystal display device having the type B electrode structure. FIG. 11 is a diagram showing the alignment texture observed image during voltage application of the liquid crystal display device having the type C electrode structure. The setting in both cases was angle θ (theta)=10° (degrees). In both types B and C, the uniformity of the shape of the dark regions had improved as with type A. As a result of externally observing the liquid crystal display devices of the respective examples of types B and C from the anti-viewing direction, and at an angle of 70° (degrees) in the clockwise and counterclockwise direction from the center thereof, the display uniformity; that is, the uniformity of light leakage at the pixel edges, had significantly improved in comparison to the conventional liquid crystal display device, and the significant improvement of the display quality was confirmed. However, it was also confirmed that the display uniformity of types B and C were slightly inferior in comparison to type A. This is considered to be the result of the existence of certain pixels having different dark region shapes and disclination positions. However, it was confirmed that the display uniformity of types B and C had sufficiently improved in comparison to the conventional liquid crystal display device.

Based on the foregoing observation results, it was discovered that the display quality of the liquid crystal display device can be significantly improved by adopting an electrode structure of bending both electrode edges of the second electrode 12 into a saw teeth shape. The bending angle θ (theta) is preferably 5° (degrees) or more and 15° (degrees) or less. Moreover, although the existence of the inflection point of the respective edges formed by the electrode edges of the second electrode 12 in one pixel is effective, with respect to the position of the inflection point, Xa is preferably three times Xb or more.

FIGS. 12A, 12B and 12C are diagrams showing the alignment texture observed image during voltage application of the liquid crystal display device having the type D electrode structure. Specifically, FIG. 12A is an image where θ (theta) =5° (degrees), FIG. 12B is an image where θ (theta)=10° (degrees), and FIG. 12C is an image where θ (theta)=15° (degrees). On observing each of the three alignment textures, the uniformity of the dark regions has improved in comparison to the conventional liquid crystal display device, but on further observation, the uniformity is slightly insufficient with θ (theta)=5° (degrees), and higher uniformity of the dark regions is achieved with θ (theta)=10° (degrees) and θ (theta) =15° (degrees). As a result of performing similar appearance observation as with types A to C described above, the display uniformity was slightly inferior in comparison with types A to C. However, it was confirmed that the display uniformity had sufficiently improved in comparison to the conventional liquid crystal display device. It was also confirmed that θ (theta) =10° (degrees) or more is more preferable.

FIG. 13 is a diagram showing the alignment texture observed image during voltage application of the liquid crystal display device having the type E electrode structure, where θ (theta) is 10° (degrees). On observing the alignment texture, although the dark region is different for each pixel, the disclination position is basically fixed to a specific position, and the alignment uniformity is relatively favorable. As a result of performing similar appearance observation as with type D described above, the display uniformity was slightly inferior in comparison with types A to C, but it was more favorable than type D. However, it was confirmed that the display uniformity had sufficiently improved in comparison to the conventional liquid crystal display device.

The difference in the display uniformity between type D and type E is considered to be caused by the difference in the pixel structure. With type D, the distribution of the multi-domain alignment during voltage application of the pixels that are adjacent in the longitudinal direction is different, and the viewing angle characteristics show different tendencies. Meanwhile, with type E, although the shape of the pixels that are adjacent in the vertical direction and the longitudinal direction is different, in reality, pixels of the same shape are arranged in a checkered pattern. Thus, it is considered that, as a result of pixels in which the distribution of the multi-domain alignment during voltage application becomes equal are arranged in a checkered pattern, the display uniformity based on appearance observation turned out to be more favorable than type D.

FIG. 14 is a diagram showing the alignment texture observed image during voltage application of the liquid crystal display device having the type G electrode structure, where θ (theta) is 10° (degrees). On observing the alignment texture, the dark region is formed with a disclination corresponding to the inflection point that is formed by the electrode edges of the first electrode 11, but it was confirmed that the uniformity of its shape was insufficient. Perhaps, by causing the angle of this apex to be a sharper angle, the disclination becomes fixed, and the dark region is also more easily fixed. Although not shown, this tendency also applies to the liquid crystal display device having the type F electrode structure. The liquid crystal display devices having the type G and type F electrode structures were observed in its appearance, but the display uniformity could not be obtained in comparison with types A to E. A significant difference could not be observed even when compared with the conventional liquid crystal display device. Accordingly, as shown in types B and C, it was confirmed that the arrangement of the inflection point so that Xa and Xb become equal relative to the longitudinal direction of the pixel is not effective. However, the foregoing is an example were the pretilt angle was set to 89.9°, and if the pretilt angle is set lower; for example, set to 89.8°, a significant difference could be observed in comparison to the conventional liquid crystal display device, and it was confirmed that it is possible to realize uniformity from the anti-viewing direction in the appearance observation as with the other types described above.

Note that, in the foregoing first embodiment, the electrode edges on either side of the second electrode were formed in a broken curve shape, but the configuration may also be such that only the electrode edge of one side is formed in a broken curve shape. In the foregoing case, the obliquely crossing line segments are desirably disposed on the anti-viewing side among the pixel edges.

(Second Embodiment)

In the second embodiment, both the improvement of display quality and the reduction of frame frequency are achieved by causing the electrode edges of the respective electrode to be a broken curve shape. Some specific structures are illustrated below. Note that the basic configuration of the liquid crystal display device is common with the foregoing first embodiment (refer to FIG. 1).

FIGS. 15A and 15B are schematic plan views showing other example of the electrode structure. As shown in FIG. 15A, the electrode edge of the respective first electrodes 11 extending in the longitudinal direction in the diagram is formed in a saw teeth shape, and one pitch of the saw teeth basically coincides with the electrode width of the respective second electrodes 12. Moreover, the electrode edges of the respective second electrodes 12 are formed in the same saw teeth shape as those shown in FIGS. 7A and 7B of the foregoing first embodiment, and one pitch of the saw teeth is set to be approximately equal to the electrode width of the respective first electrodes 11. As shown in FIG. 15B, with the respective first electrodes 11, one apex angle portion (inflection point) of the saw teeth overlaps with the substantial center part of the second electrodes 12, and the other apex angle portion (inflection point) is disposed to overlap with the space between the second electrodes 12. Likewise, with the respective second electrodes 12, one apex angle portion (inflection point) of the saw teeth overlaps with the substantial center part of the first electrodes 11, and the other apex angle portion (inflection point) is disposed to overlap with the space between the first electrodes 11. Since the regions where the respective first electrodes 11 and the respective second electrodes 12 intersect become one pixel, respectively, the shape of one pixel becomes a octagonal shape that is demarcated by two electrode edges of the first electrode 11 and two electrode edges of the second electrode 12.

In FIG. 15B, when the angle formed by the electrode edge of the saw teeth-shaped first electrode 11 and the vertical direction (upward direction in the diagram) is defined as θ (theta), this angle θ (theta) is set to be from greater than 0° (degree) to 15° (degrees) or below. It is thereby possible to achieve a structure where the two edges; namely, the upper and lower edges of the respective pixels and the directions 13, 14 of the respective alignment treatments are not orthogonal. With the respective pixels in this electrode structure, the pixels that are adjacent in the vertical direction and the pixels that are adjacent in the longitudinal direction are of the same shape. Moreover, the angle formed by the electrode edges of the second electrode 12 and the horizontal direction is set to be from greater than 0° (degree) to 15° (degrees) or below. (Also, refer to FIG. 7B) It is thereby possible to achieve a structure where the two edges; namely, the upper and lower edges of the respective pixels and the directions 13, 14 of the respective alignment treatments are not orthogonal. Note that the respective second electrodes 12 can also have the same electrode structure as shown in FIGS. 8A and 8B of the foregoing first embodiment. In the foregoing case, the shape of the pixels that are adjacent in the vertical direction is different, but the pixels that are adjacent in the longitudinal direction are of the same shape. In the ensuing explanation, the electrode structure shown in FIGS. 15A and 15B is also referred to as the "type H electrode structure".

Next, with reference to the electrode structure (type F electrode structure) shown in FIGS. 7A and 7B and the electrode structure (type G electrode structure) shown in FIGS. 8A and 8B of the foregoing first embodiment, the electrode structure (type H electrode structure) shown in FIGS. 15A and 15B is now explained. Specifically, liquid crystal display devices having the respective pixel structures of types F, G and H were actually prepared, and the results on performing alignment texture observation and appearance observation are now explained. In the actually prepared liquid crystal display devices, the specific numerical value conditions based on the type of each electrode structure were as follows. Note that, in all types, the distance between adjacent electrodes of the respective first electrodes 11 and the respective second electrode 12 was set to 0.03 mm so that the opening area would not drop. Moreover, with respect to the first electrode 11 and the second electrode 12, the distance between the inflection points was set to 0.215 mm, and θ (theta) was set to 5° (degrees), 10° (degrees), and 15° (degrees). The direction of the alignment treatment, the director of the liquid crystal molecules at the substantial center of the liquid crystal layer 3, and the status of arrangement of the respective polarizers were as described above.

Figure 16A:
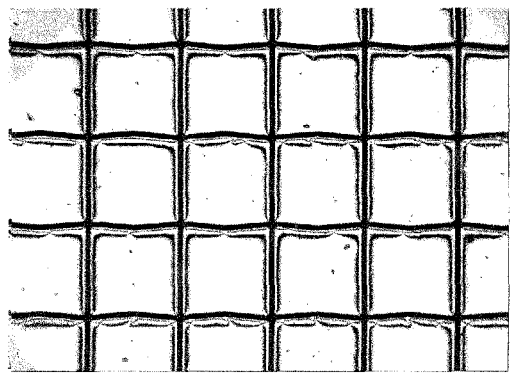
FIGS. 16A, 16B and 16C are diagrams showing the alignment texture observed image during voltage application of the liquid crystal display device having the type G electrode structure.
Figure 16B:
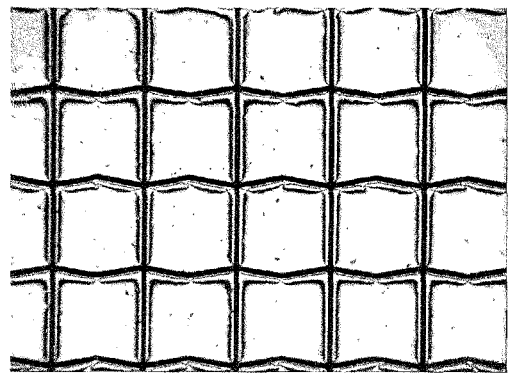
Figure 16C:
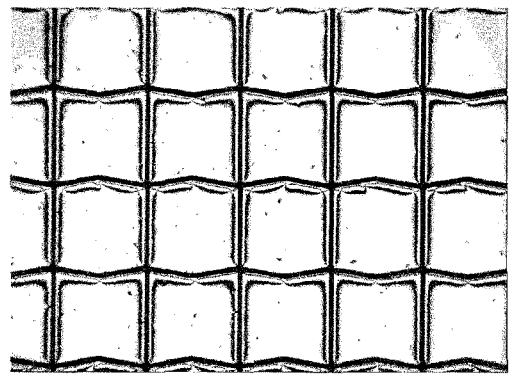

FIGS. 16A, 16B and 16C are diagrams showing the alignment texture observed image during voltage application of the liquid crystal display device having the type G electrode structure. Specifically, FIG. 16A is an image where θ (theta) =5° (degrees), FIG. 16B is an image where θ (theta)=10° (degrees), and FIG. 16C is an image where θ (theta)=15° (degrees). In all alignment textures, it was confirmed that the uniformity of the distribution of the dark regions in the pixel edges had improved in comparison to the conventional liquid crystal display device (refer to FIG. 35). However, in the alignment texture where θ (theta)=5° (degrees), the uniformity of the disclination position existing in the vicinity of the inflection point is insufficient. Meanwhile, in the respective alignment textures where θ (theta)=10° (degrees) and θ (theta)=15° (degrees), the uniformity of the dark regions tended to improve in accordance with the increase of θ (theta).

Figure 17A:
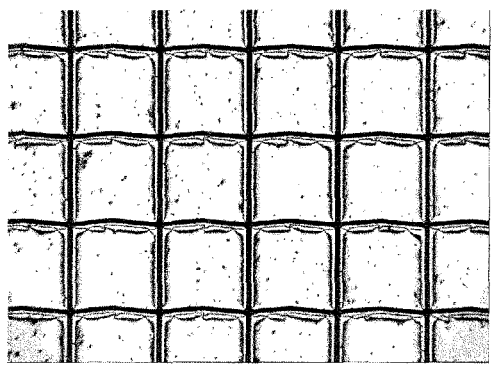
FIGS. 17A, 17B and 17C are diagrams showing the alignment texture observed image during voltage application of the liquid crystal display device having the type F electrode structure.
Figure 17B:
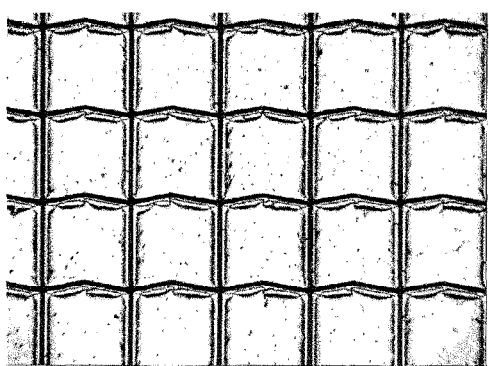
Figure 17C:
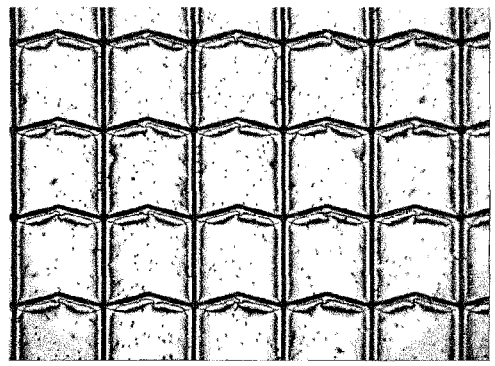

FIGS. 17A, 17B and 17C are diagrams showing the alignment texture observed image during voltage application of the liquid crystal display device having the type F electrode structure. Specifically, FIG. 17A is an image where θ (theta) =5° (degrees), FIG. 17B is an image where θ (theta)=10° (degrees), and FIG. 17C is an image where θ (theta)=15° (degrees). A similar tendency was observed with the liquid crystal display device having this type F electrode structure as with the case of type G described above.

Next, with reference to the liquid crystal display devices having the respective electrode structures of type F and type G described above and the conventional liquid crystal display device, the evaluation results regarding the driving frequency dependency of the display uniformity during a light display state are explained. The driving conditions were multiplex driving based on 1/64 duty, 1/9 bias, and a frame inverted waveform, a light display state driving voltage capable of obtaining an approximate maximum contrast was used, and the lower limit of the frame frequency, in which display non-uniformity is observed, was evaluated through appearance observation.

Consequently, while the lower limit of the frame frequency was 105 Hz with the conventional liquid crystal display device, with regard to the liquid crystal display device having the type G electrode structure described above, the frame frequency changed as 110 Hz, 130 Hz, 130 Hz on setting θ (theta) to 5° (degrees), 10° (degrees), and 15° (degrees). Meanwhile, it was revealed that the display uniformity when observed from the anti-viewing direction is improved as θ (theta) is increased. Moreover, with regard to the liquid crystal display device having the type F electrode structure described above, the frame frequency changed as 120 Hz, 135 Hz, 150 Hz on setting θ (theta) to 5°, 10°, and 15°. It was revealed that the display uniformity when observed from the anti-viewing direction is improved as θ (theta) is increased. Accordingly, with both type F and type G, although the display uniformity when observed from the anti-viewing direction is improved as θ (theta) is increased, the frame frequency capable of obtaining the display uniformity when viewed from the front tended to increase.

Figure 18A:
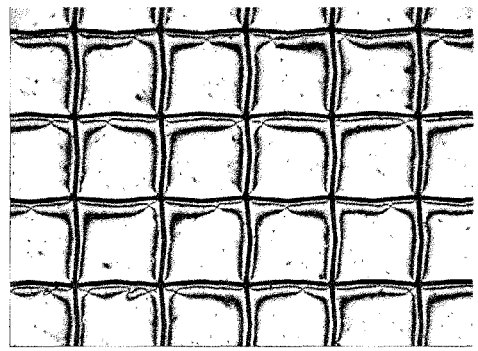
FIGS. 18A, 18B and 18C are diagrams showing the alignment texture observed image during voltage application of a liquid crystal display device having the type H electrode structure as the first electrode, and having the same electrode structure as type G electrode structure as the second electrode.
Figure 18B:
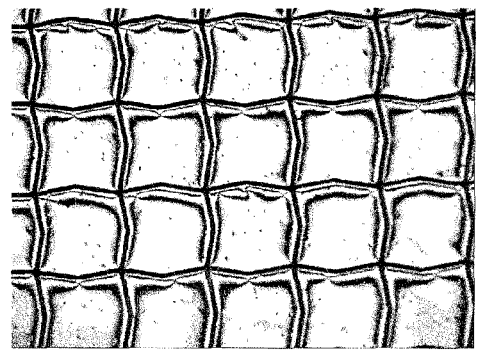
Figure 18C:
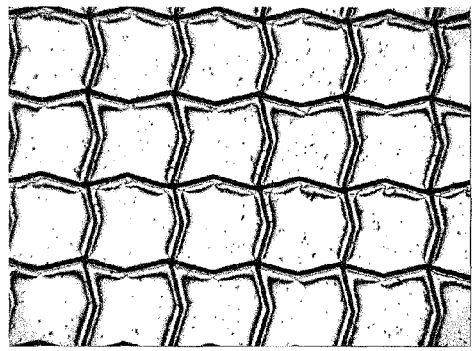

FIGS. 18A, 18B and 18C are diagrams showing the alignment texture observed image during voltage application of a liquid crystal display device having the type H electrode structure as the first electrode, and having the same electrode structure as shown in FIGS. 8A and 8B as the second electrode. Specifically, FIG. 18A is an image where θ (theta)=5°, FIG. 18B is an image where θ (theta)=10°, and FIG. 18C is an image where θ (theta)=15°. In all alignment textures, the dark regions in the pixel edges were basically the same as the alignment texture shown in FIGS. 16A, 16B and 16C in relation to the second electrode 12, and it can be seen that the dark regions are distributed relatively uniform excluding the case of θ (theta)=5°. The uniformity of the distribution of the dark regions was also favorable with the first electrode 11. The display uniformity in the appearance observation from the anti-viewing direction had improved even more than the liquid crystal display devices having the respective electrode structures of type F and type G described above, and had improved more than the conventional liquid crystal display device. The driving frequency dependency of the display uniformity on observing this liquid crystal display device from the front was evaluated on the same conditions as those described above. Consequently, the result was 95 Hz, 100 Hz, 90 Hz relative to θ (theta)=5°, 10°, and 15°, respectively, and no dependency on θ (theta) could be observed. Moreover, it was confirmed that the lower limit of the frame frequency was reduced more than that of the conventional liquid crystal display device and the respective liquid crystal display devices of types F and G described above.

Figure 19A:
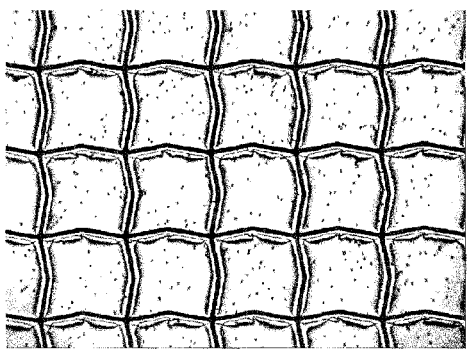
FIGS. 19A and 19B are diagrams showing the alignment texture observed image during voltage application of a liquid crystal display device having the type H electrode structure as the first electrode, and having the same electrode structure as type F electrode structure as the second electrode.
Figure 19B:
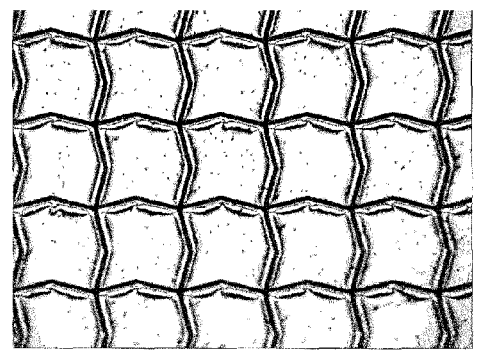

FIGS. 19A and 19B are diagrams showing the alignment texture observed image during voltage application of a liquid crystal display device having the type H electrode structure as the first electrode, and having the same electrode structure (type F electrode structure) as shown in FIGS. 7A and 7B as the second electrode. Specifically, FIG. 19A is an image where θ (theta)=10°, and FIG. 19B is an image where θ (theta)=15°. The dark regions observed in the vicinity of the electrode edges of the second electrode 12 have higher uniformity than the conventional liquid crystal display device, and a similar tendency as the liquid crystal display device having the type G electrode structure can be observed. Meanwhile, it has also been confirmed that the uniformity of the dark regions can be sufficiently obtained even in the electrode edges of the first electrode 11. The display uniformity in the appearance observation from the anti-viewing direction is the same as the liquid crystal display device having the type F electrode structure shown in FIGS. 17A, 17B and 17C, and had improved in comparison to the conventional liquid crystal display device. Moreover, on evaluating the driving frequency dependency of the display uniformity on observing this liquid crystal display device from the front on the same conditions as those described above, the lower limit of the frame frequency was 100 Hz in both θ (theta)=10° and 15°, and it was confirmed that the lower limit of the frame frequency can be reduced more than the conventional liquid crystal display device and the respective liquid crystal display devices of types F and G described above.

Based on the foregoing results, it can be determined that the adoption of a flexible electrode structure for both the first electrode and the second electrode is effective in reducing the lower limit of the frame frequency. The value of θ (theta) in the foregoing case is preferably 5° or more. Meanwhile, in order to further improve the display uniformity from the anti-viewing direction, θ (theta) is preferably set to 10° or more and 15° or less.

Note that, in the foregoing second embodiment, although the electrode edges on either side of the first electrode and the second electrode were of the same shape, they can also be of different shapes.

(Third Embodiment)

In the third embodiment, by causing the electrode edge of the respective second electrodes 12 to be a broken curve shape including a line segment which obliquely crosses the extending direction (first direction) of the first electrode, a structure is achieved where the pixel edge of the portion that is demarcated by the electrode edge of the respective second electrodes 12 among the respective pixels and the directions 13, 14 of the respective alignment treatment are not orthogonal. Moreover, by providing rectangular openings to the respective first electrodes 11, the reduction of the frame frequency is sought. Some specific structures are illustrated below. Note that the basic configuration of the liquid crystal display device is common with the foregoing first embodiment (refer to FIG. 1).

The electrode structure of the second electrode in the third embodiment is common with the foregoing first embodiment. Specifically, the second electrode in the third embodiment has the type D electrode structure shown in FIGS. 5A and 5B, the type E electrode structure shown in FIGS. 6A and 6B, the type F electrode structure shown in FIGS. 7A and 7B, or the type G electrode structure shown in FIGS. 8A and 8B of the foregoing first embodiment.

Figure 20:
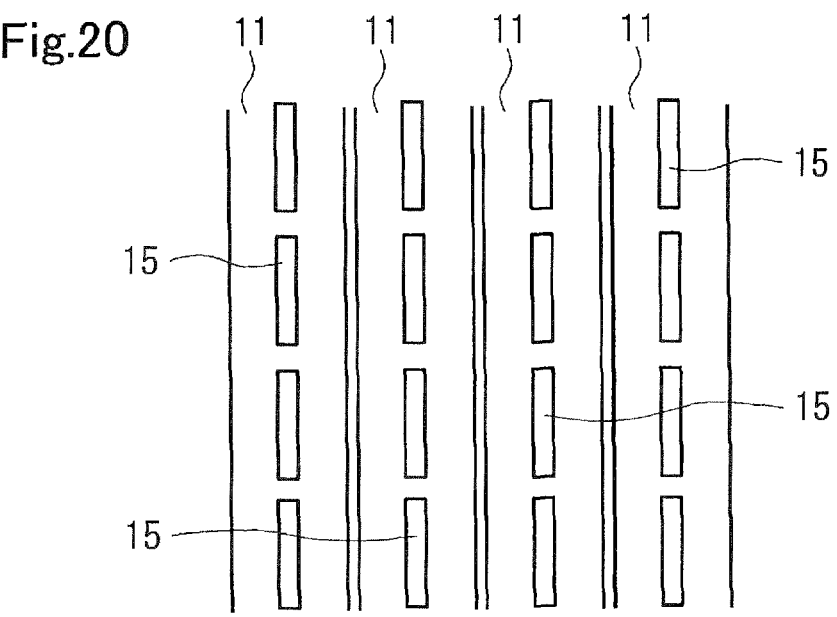
FIG. 20 is a diagram showing an example of the electrode structure of the first electrode having the openings.
Figure 21:
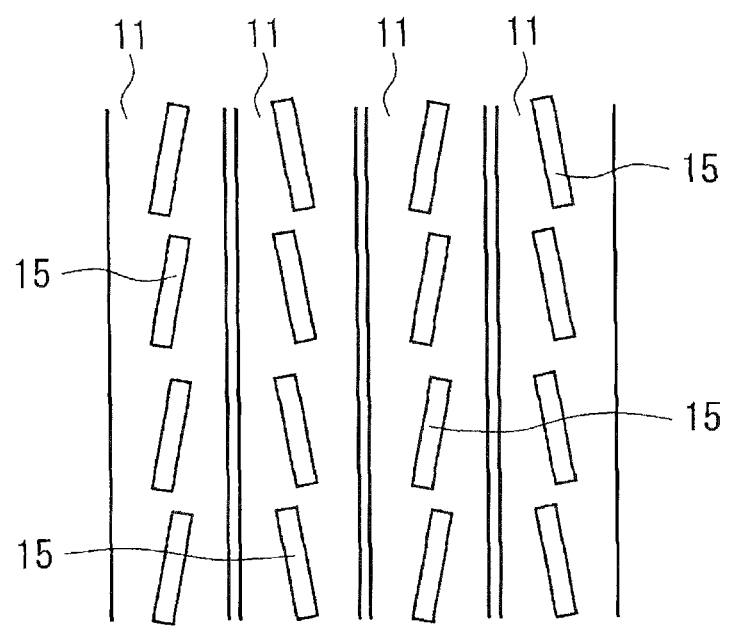
FIG. 21 is a diagram showing an example of the electrode structure of the first electrode having the openings.

FIG. 20 is a diagram showing an example of the electrode structure of the first electrode having the openings. As shown in FIG. 20, the respective first electrodes 11 are provided with rectangular openings 15 which are long along their respective first directions as the extending directions. In the illustrated example, the longitudinal direction of the respective openings 15 is substantially parallel to the first direction, and the openings 15 are arranged along the longitudinal direction. As shown in FIG. 21, note that the longitudinal direction of the respective openings 15 can also be arranged at a predetermined angle relative to the first direction. For example, the longitudinal direction of the respective openings 15 may also be a direction that is substantially orthogonal to the electrode edges of the second electrode 12. Moreover, in the illustrated example, although the inclination direction of the respective openings 15 between the adjacent first electrodes 11 is alternated, the inclination direction may also be the same.

The structure of the pixel that is configured from the combination of the foregoing first electrode 11 and the second electrode 12 is now explained.

Figure 22:
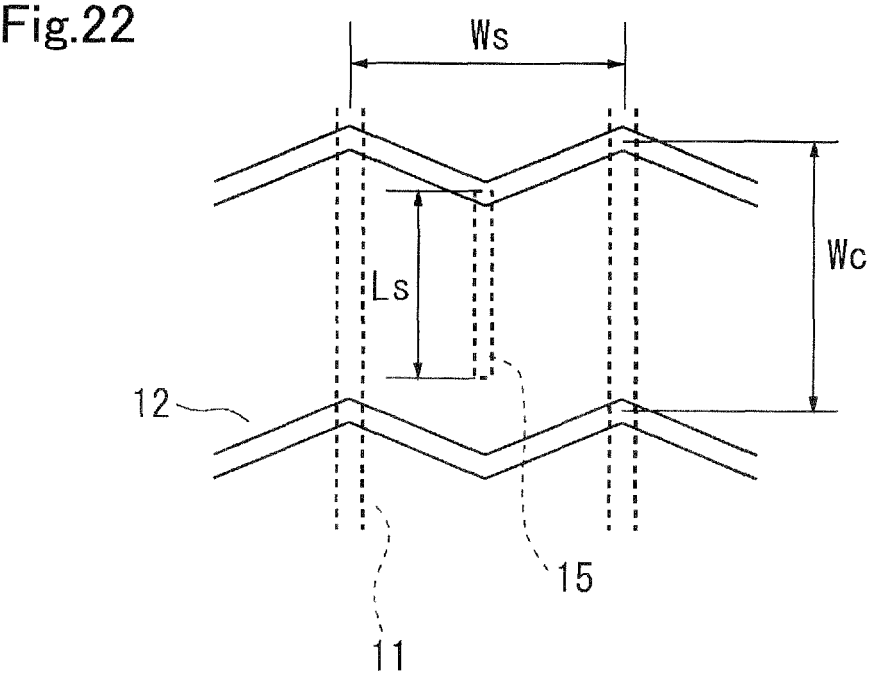
FIG. 22 is a diagram showing an example of the electrode structure.

FIG. 22 is a diagram showing an example of the electrode structure. This example is a one pixel electrode structure that is obtained by combining the second electrode 12 having the foregoing type F electrode structure and the first electrode 11 having the openings 15 shown in FIG. 20. The electrode pitch of the first electrodes 11 is Ws, the electrode pitch of the second electrodes 12 is Wc, and the long side length (length of longitudinal direction) of the openings 15 provided to the first electrode 11 is Ls. In this example, one edge (short side) of the opening 15 is disposed so as to overlap with the space between the adjacent second electrodes 12, and to overlap with the inflection point of the second electrode 12.

Figure 23:
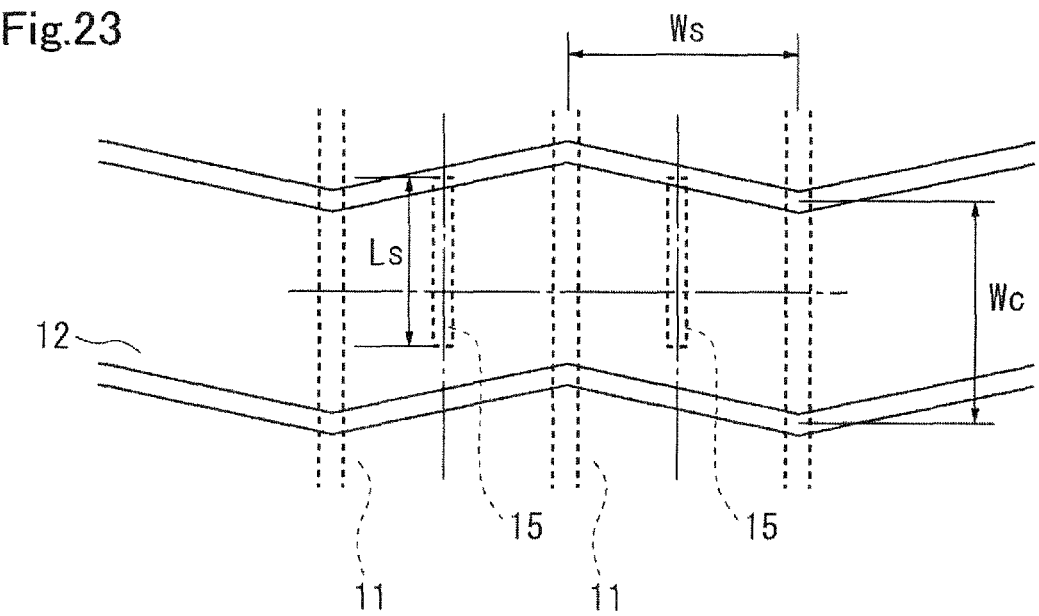
FIG. 23 is a diagram showing other example of the electrode structure.

FIG. 23 is a diagram showing other example of the electrode structure. This example is a one pixel electrode structure obtained by combining the second electrode 12 having the foregoing type D electrode structure and the first electrode 11 having the openings 15 shown in FIG. 20. The electrode pitch of the first electrodes 11 is Ws, the electrode pitch of the second electrodes 12 is Wc, and the long side length (length of longitudinal direction) of the openings 15 provided to the first electrode 11 is Ls. In this example, the opening 15 is disposed at the substantial center relative to the width direction of the first electrode 11 in the pixel, and disposed so as to overlap with the space between the second electrodes 12 to which one edge (short side) is adjacent. In this example, the opening 15 is disposed at the substantial center relative to the width direction of the first electrode 11 in the pixel, and one edge (short side) of the opening 15 is disposed so as to overlap with the space between the adjacent second electrodes 12.

FIG. 24 is a diagram showing other example of the electrode structure. This example is a one pixel electrode structure obtained by combining the second electrode 12 having the foregoing type D electrode structure and the first electrode 11 having the openings 15 arranged obliquely as shown in FIG. 21. The electrode pitch of the first electrodes 11 is Ws, and the electrode pitch of the second electrodes 12 is Wh. Moreover, the long side length (length of longitudinal direction) of the openings 15 arranged obliquely and provided to the first electrode 11 is Lt. In this example, the opening 15 is disposed so as to include the center of gravity of the pixel (shown by intersecting the dashed lines in the diagram).

In addition to the several combinations illustrated above, the respective electrode structures of the second electrode 12 of types D to G and the respective electrode structures of the first electrode 11 shown in FIG. 21 and FIG. 22 can also be combined as needed.

Next, liquid crystal display devices having the respective pixel structures described above were actually prepared, and the results on performing alignment texture observation and appearance observation are now explained. In the actually prepared liquid crystal display devices, the specific numerical value conditions based on the type of each electrode structure were as follows.

(1) With respect to type D, the distance between adjacent refractive points was set to 0.43 mm, and θ (theta) was set to 5° (degrees), 10° (degrees), and 15° (degrees).

(2) With respect to type E, the setting was the same as type D.

(3) With respect to type F, the distance between adjacent refractive points was set to 0.215 mm, and θ (theta) was set to 5° (degrees), 10° (degrees), and 15° (degrees).

(4) With respect to type G, the setting was the same as type F.

Note that the electrode pitch Ws of the first electrodes 11 was set to 0.43 mm, the electrode pitch We of the second electrodes 12 was set to 0.43 mm, and the long side length Ls of the opening 15 was set to 0.43 mm, 0.32 mm, or 0.215 mm. With respect to the openings 15 arranged obliquely, the long side length Lt of the opening 15 relative to the electrode width Wh of the second electrode 12 was set to even (Lt=Wh), 0.75 times (Lt=0.75 Wh), or 0.5 times (Lt=0.5 Wh).

Moreover, in all types, the distance between adjacent electrodes of the respective second electrode 12 was set to 0.03 mm so that the opening area would not drop. Moreover, with respect to the first electrode 11, the electrode arrangement pitch was set to 0.43 mm, and the distance between adjacent electrodes was set to 0.03 mm. The direction of the alignment treatment, the director of the liquid crystal molecules at the substantial center of the liquid crystal layer 3, and the status of arrangement of the respective polarizers were as described above.

Foremost, the results of the alignment texture observation and appearance observation of the liquid crystal display device in which the openings 15 are not provided to the first electrode 11 are explained.

FIG. 25A is a diagram showing the alignment texture observed image during voltage application when θ (theta) is set to 10° (degrees) in the type D electrode structure. As shown in the diagram, although dark regions can be observed in the vicinity of the pixel edges, the distribution pattern of the dark regions has regularity in comparison to the foregoing conventional liquid crystal display device, and the uniformity is high. However, since the pixel shapes are different relative to the direction in which the second electrode 12 is extending, the dark region patterns do not coincide completely. However, in the appearance observation, the uniformity of light leakage from the vicinity of the pixel edges had improved when viewed from the anti-viewing direction, and, consequently, it was confirmed that the display uniformity had also improved.

FIG. 25B is a diagram showing the alignment texture observed image during voltage application when θ (theta) is set to 10° (degrees) in the type E electrode structure. As with the case of type D described above, uniformity can be observed in the distribution pattern of the dark regions in the vicinity of the pixel edges in comparison to the conventional liquid crystal display device. The shape of the pixels in the respective extending directions of the adjacent first electrode 11 and the second electrode 12 is different, but pixels of the same shape are arranged in a checkered pattern. In the appearance observation from the anti-viewing direction, the uniformity of light leakage in the vicinity of the pixel edges had improved, and, consequently, it was confirmed that the display uniformity had also improved. The display uniformity was superior to the case of the foregoing type D electrode structure (refer to FIG. 25A).

FIG. 25C is a diagram showing the alignment texture observed image during voltage application when θ (theta) is set to 10° (degrees) in the type G electrode structure. Although this example is slightly inferior in comparison to the foregoing type D and type E electrode structures, uniformity can be observed in the distribution pattern of the dark regions in the vicinity of the pixel edges in comparison to the conventional liquid crystal display device. In the appearance observation from the anti-viewing direction, the uniformity of light leakage in the vicinity of the pixel edges had improved slightly, and, consequently, it was confirmed that the display uniformity had also improved. Note that, although not shown, the same observation results were obtained in the case of the type F electrode structure.

In relation to the liquid crystal display devices having the respective electrode structures of types D to G described above and the conventional liquid crystal display device, the driving frequency dependency of the display uniformity during a light display state when viewed from the front was evaluated. The driving conditions were multiplex driving based on 1/64 duty, 1/9 bias, and a frame inverted waveform, a light display state driving voltage capable of obtaining an approximate maximum contrast was used, and the lower limit of the frame frequency, in which display non-uniformity is observed, was evaluated through appearance observation.

Consequently, the frame frequency was 105 Hz in the conventional liquid crystal display device, 115 Hz in the case of the type D electrode structure, 95 Hz in the case of the type E electrode structure, 135 Hz in the case of the type F electrode structure, and 130 Hz in the case of the type G electrode structure, and it was confirmed that the display uniformity cannot be obtained unless the lower limit of the frame frequency is of a higher region than the conventional liquid crystal display device, excluding type E. In addition, when θ (theta) was changed to 5° (degrees), 10° (degrees), and 15° (degrees) in type E, the lower limit of the frame frequency tended to change to 120 Hz, 135 Hz, and 150 Hz. Meanwhile, since the display uniformity when viewed from the anti-viewing direction improved as θ (theta) was increased, it was confirmed that they are of a trade-off relationship. This tendency also applied to the other types.

Next the results of the alignment texture observation and appearance observation of the liquid crystal display device in which the openings 15 are provided to the first electrode 11 are explained.

Figure 26A:
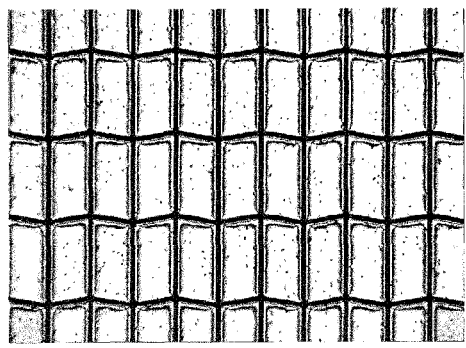
FIGS. 26A, 26B and 26C are diagrams showing the alignment texture observed image during voltage application when the foregoing type F electrode structure and the electrode structure shown in FIG. 20 are combined, and setting θ (theta) to 10°.
Figure 26B:
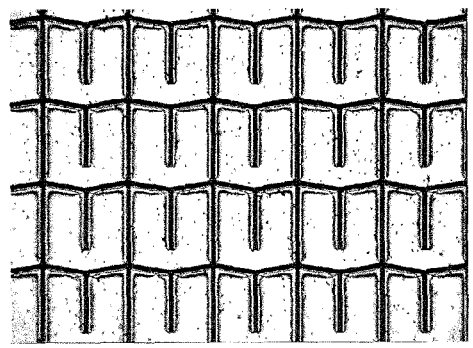
Figure 26C:
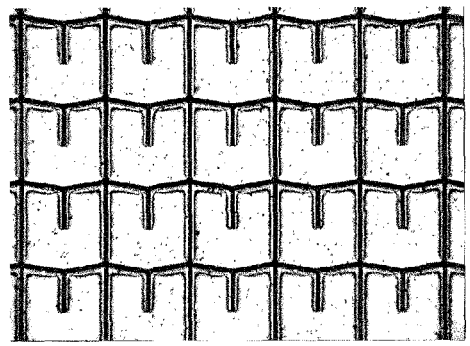

FIGS. 26A, 26B and 26C is a diagram showing the alignment texture observed image during voltage application when the foregoing type F electrode structure and the electrode structure shown in FIG. 20 are combined, and setting θ (theta) to 10°. Note that the long side length Ls of the opening 15 was set to 0.43 mm, 0.32 mm, or 0.215 mm, and the respective images thereof are shown in FIG. 26A, FIG. 26B, and FIG. 26C. In the image shown in FIG. 26A, although the uniformity of the shape of the dark regions that appeared on the long side of the openings 15 is favorable, the dark regions appearing in the vicinity of the electrode edges of the second electrode 12 were relatively distributed with regularity. In FIG. 26B and FIG. 26C, since the side regions of the openings 15 decrease due to the decrease of the long side length of the openings 15, the rise in the aperture ratio of the pixels and the improvement in uniformity of the distribution pattern of the dark regions can be observed.

Moreover, as a result of observing the liquid crystal display devices of the respective conditions in its appearance from the anti-viewing direction, the non-uniformity for each pixel could not be observed as easily as a result of arranging the openings 15, and the display uniformity had improved significantly. The cause of this is considered to be that the multi-domain alignment structure in the pixel became stabilized as a result of disposing the opening 15 at the infliction point of the second electrode 12. In particular, the alignment properties are also improved in the vicinity of the pixel edge at the upper part of the pixels where dark regions appear when the openings 15 are not provided, and the uniformity from the standpoint of appearance was improved.

By using the liquid crystal display device of the respective conditions described above, the frame frequency dependency of the display uniformity during a light display state when viewed from the front was observed, and the lower limit of the frame frequency capable of obtaining display uniformity was evaluated through appearance observation. Similar to the above, the driving conditions were multiplex driving based on 1/64 duty, 1/9 bias, and a frame inverted waveform, a light display state driving voltage capable of obtaining an approximate maximum contrast was used, and the lower limit of the frame frequency, in which display non-uniformity is observed, was evaluated through appearance observation. Consequently, in the respective liquid crystal display devices in which the long side length Ls of the opening 15 was set to 0.43 mm, 0.32 mm, or 0.215 mm, the lower limit of the frame frequency were 80 Hz, 90 Hz, and 95 Hz, respectively. And it was confirmed that the lower limit of the frame frequency in all cases decreased considerably in comparison to the liquid crystal display device in which the openings 15 are not provided and the conventional liquid crystal display device. Note that, as Ls was shortened, the lower limit of the frame frequency tended to increase. However, it was confirmed that the effects could be obtained so as long as Ls is ½ or more of the electrode width or electrode pitch of the second electrode 12. Although this examination adopted a configuration where the opening 15 overlaps with the inflection point of the electrode edge of the second electrode 12, it was confirmed that the effect of reducing the lower limit of the frame frequency can be obtained even with a configuration where the two do not overlap.

Figure 27A:
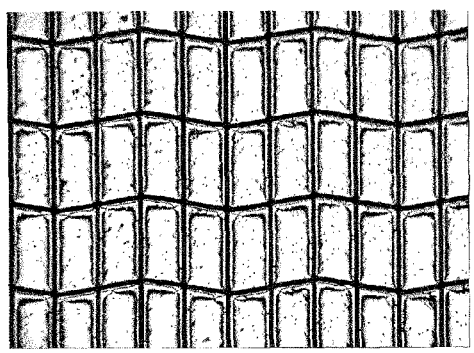
FIG. 27A is a diagram showing the alignment texture observed image during voltage application when the foregoing type D electrode structure and the electrode structure shown in FIG. 20 are combined, and setting θ (theta) to 10°.

FIG. 27A is a diagram showing the alignment texture observed image during voltage application when the foregoing type D electrode structure and the electrode structure shown in FIG. 20 are combined, and setting θ (theta) to 10°. Note that θ (theta) was set to 10° (degrees), and the long side length Ls of the opening 15 was set to 0.43 mm. The uniformity of the distribution pattern of the dark region has clearly improved in comparison to the example shown in FIGS. 26A, 26B and 26C, and the dark regions in the vicinity of the electrode edges of the second electrode 12 are also distributed relatively uniform. The uniformity of light leakage in the vicinity of the pixel edges observed from the anti-viewing direction had improved significantly in comparison to the case of not providing the openings 15, and it was confirmed that the display uniformity had improved considerably. As a result of observing the frame frequency dependency of the display uniformity during a light display state when viewed from the front and evaluating the lower limit of the frame frequency capable of obtaining display uniformity, the lower limit of the frame frequency was 80 Hz, and it was confirmed that considerable improvement is possible in comparison to the case of not providing the openings 15.

Figure 27B:
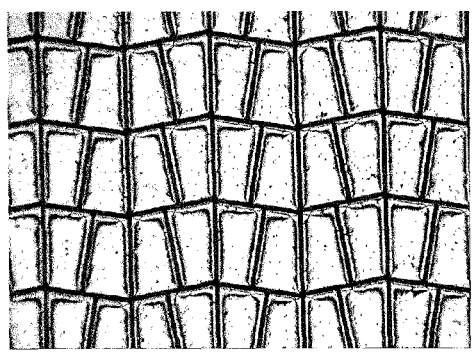
FIG. 27B is a diagram showing the alignment texture observed image during voltage application when the foregoing type D electrode structure and the electrode structure shown in FIG. 21 are combined, and setting θ (theta) to 10° (degrees).

FIG. 27B is a diagram showing the alignment texture observed image during voltage application when the foregoing type D electrode structure and the electrode structure shown in FIG. 21 are combined, and setting θ (theta) to 10° (degrees). Note that θ (theta) was set to 10° (degrees), and the long side length Lt of the opening 15 was set to be equal to the electrode width of the second electrode 12. The uniformity of the distribution pattern of the dark regions is considered to be high and favorable as with FIG. 27A. The uniformity of light leakage in the vicinity of the pixel edges observed from the anti-viewing direction had improved significantly in comparison to the case of not providing the openings 15, and it was confirmed that the display uniformity had improved considerably. As a result of observing the frame frequency dependency of the display uniformity during a light display state when viewed from the front and evaluating the lower limit of the frame frequency capable of obtaining display uniformity, the lower limit of the frame frequency was 75 Hz, and it was confirmed that considerable improvement is possible in comparison to the case of not providing the openings 15. This example was able to achieve the lowest value in comparison to the other electrode structures.

The display uniformity in the anti-viewing direction of the liquid crystal display device of an electrode structure having the openings 15 and the lower limit of the frame frequency capable of obtaining display uniformity when viewed from the front were evaluated above, but it is anticipated that similar improvements can be obtained through combination with an electrode structure of the second electrode 12 of other types.

Note that, in the foregoing third embodiment, although one opening was provided in the respective pixels, two or more openings may also be provided in the respective pixels. As a result of providing a plurality of openings, it is considered that the lower limit of the frame frequency can further be reduced.

(Fourth Embodiment)

In the fourth embodiment, by causing the electrode edge of the respective second electrodes 12 to be a broken curve shape including a line segment which obliquely crosses the extending direction (first direction) of the first electrode, a structure is achieved where the pixel edge of the portion that is demarcated by the electrode edge of the respective second electrodes 12 among the respective pixels and the directions 13, 14 of the respective alignment treatment are not orthogonal, and the respective pixels become pixel edges that are long in one direction. Some specific structures are illustrated below. Note that the basic configuration of the liquid crystal display device is common with the foregoing first embodiment (refer to FIG. 1).

FIGS. 28A and 28B are schematic plan views showing an example of the electrode structure. As shown in FIG. 28A, the electrode edge of the respective second electrodes 12 extending in the longitudinal direction in the diagram is formed in a saw teeth shape, and ¼ pitch of the saw teeth basically coincides with the electrode width of the respective first electrodes 11. In addition, as shown in FIG. 28B, the respective second electrodes 12 are disposed in a state where one apex angle portion (inflection point) of the saw teeth overlaps with the portion between the first electrodes 11. Since the regions where the respective first electrodes 11 and the respective second electrodes 12 intersect become one pixel, respectively, the shape of one pixel becomes a substantial parallelogram, which is long in one direction, that is demarcated by two electrode edges of the first electrode 11 and two electrode edges of the second electrode 12. In the ensuing explanation, the electrode structure shown in FIGS. 28A and 28B is also referred to as the "type I electrode structure".

In FIG. 28B, when the angle formed by the electrode edge of the second electrode 12 and the horizontal direction (longitudinal direction in the diagram) is defined as θ (theta), this angle θ (theta) is set to be from greater than 0° (degree) to 15° (degrees) or below. It is thereby possible to realize a structure where the two edges; namely, the upper and lower edges of the respective pixels and the directions 13, 14 of the respective alignment treatments are not orthogonal. With the respective pixels in this electrode structure, the shape of the pixels that are adjacent in the vertical direction is the same, but there are two types of pixel edge shapes that change for each inflection point. Note that, in the illustrated example, although two first electrodes 11 are arranged mutually between the inflection points of the respective second electrodes 12, three or more first electrodes 11 can also be arranged. To put it differently, the electrode width of the respective second electrodes 12 can be set to substantially ½ or less of the electrode width of the first electrode 11.

FIGS. 29A and 29B are other schematic plan views showing an example of the electrode structure. As shown in FIG. 29A, the electrode edge of the respective second electrodes 12 extending in the longitudinal direction in the diagram is formed in a saw teeth shape, and ¼ pitch of the saw teeth basically coincides with the electrode width of the respective first electrodes 11. The difference with the type I electrode structure shown in FIGS. 28A and 28B is that the inflective directions are mutually different at the one electrode edge and the other electrode edge of the respective second electrodes 12, and the inflectional apexes of both electrode edges repeatedly approach each other and separate from each other. In addition, as shown in FIG. 29B, the respective second electrodes 12 are disposed in a state where one apex angle portion (inflection point) of the saw teeth overlaps with the portion between the first electrodes 11. Since the regions where the respective first electrodes 11 and the respective second electrodes 12 intersect become one pixel, respectively, the shape of one pixel becomes a substantial trapezoidal shape, which is long in one direction, that is demarcated by two electrode edges of the first electrode 11 and two electrode edges of the second electrode 12. In the ensuing explanation, the electrode structure shown in FIGS. 29A and 29B is also referred to as the "type J electrode structure". Note that, in the illustrated example, although two first electrodes 11 are arranged mutually between the inflection points of the respective second electrodes 12, three or more first electrodes 11 can also be arranged. To put it differently, the electrode width of the respective second electrodes 12 can be set to substantially ½ or less of the average value of the widest site and narrowest site of the electrode width of the first electrode 11.

In FIG. 29B, when the angle formed by the electrode edge of the second electrode 12 and the horizontal direction (longitudinal direction in the diagram) is defined as θ (theta), this angle θ (theta) is set to be from greater than 0° (degree) to 15° (degrees) or below. It is thereby possible to realize a structure where the two edges; namely, the upper and lower edges of the respective pixels and the directions 13, 14 of the respective alignment treatments are not orthogonal. With the respective pixels in the type J electrode structure, the shape of pixels that are adjacent in the vertical direction and the shape of the pixels that are adjacent in the longitudinal direction are both different. In other words, this type J electrode structure has four pixels of different shapes.

FIGS. 30A and 30B are other schematic plan views showing an example of the electrode structure. As shown in FIG. 30A, the electrode edge of the respective second electrodes 12 extending in the longitudinal direction in the diagram is formed in a saw teeth shape, and ½ pitch of the saw teeth basically coincides with the electrode width of the respective first electrodes 11. And, as shown in FIG. 29B, the respective second electrodes 12 are disposed in a state where one apex angle portion (inflection point) of the saw teeth overlaps with the portion between the first electrodes 11. Since the regions where the respective first electrodes 11 and the respective second electrodes 12 intersect become one pixel, respectively, the shape of one pixel becomes a substantial parallelogram, that is demarcated by two electrode edges of the first electrode 11 and two electrode edges of the second electrode 12. In the ensuing explanation, the electrode structure shown in FIGS. 30A and 30B is also referred to as the "type K electrode structure". Note that, in the illustrated example, although two first electrodes 11 are arranged mutually between the inflection points of the respective second electrodes 12, three or more first electrodes 11 can also be arranged. To put it differently, the electrode width of the respective second electrodes 12 can be set to substantially ½ or less of the electrode width of the first electrode 11.

In FIG. 30B, when the angle formed by the electrode edge of the second electrode 12 and the horizontal direction (longitudinal direction in the diagram) is defined as θ (theta), this angle θ (theta) is set to be from greater than 0° (degree) to 15° (degrees) or below. It is thereby possible to realize a structure where the two edges; namely, the upper and lower edges of the respective pixels and the directions 13, 14 of the respective alignment treatments are not orthogonal. With the respective pixels in this electrode structure, the pixels that are adjacent in the vertical direction and the pixels that are adjacent in the longitudinal direction become the same pixel edge shape in both cases.

FIGS. 31A and 31B are other schematic plan views showing an example of the electrode structure. The electrode structure shown in FIG. 31B is a result of additionally providing flexibility also to the respective first electrodes 11 and causing the electrode edge to be a broken curve shape in the type I electrode structure shown in FIG. 28B. Specifically, as shown in FIG. 31B, with the respective first electrodes 11, one electrode edge is formed linearly, and the other electrode edge is formed in a saw teeth shape. Moreover, in this example, two first electrodes 11 in which the electrode edges of the saw teeth shape face each other configure a pair, and this pair of first electrodes 11 is repeatedly arranged. It is thereby possible to improve the efficiency of the space usage for arranging the first electrodes 11. In the ensuing explanation, the electrode structure shown in FIGS. 31A and 31B is also referred to as the "type L electrode structure". Note that the configuration shown in FIGS. 31A and 31B is merely an example, and both electrode edges of the respective first electrodes 11 can also be formed in a saw teeth shape. Moreover, the first electrode 11 in which one or both electrode edges are formed in a broken curve shape can also be combined with the respective types of electrode structures described above.

Next, liquid crystal display devices having the respective pixel structures of types I to L described above were actually prepared, and the results on performing alignment texture observation and appearance observation are now explained. In the actually prepared liquid crystal display devices, the specific numerical value conditions based on the type of each electrode structure were as follows. Note that, in all types, the distance between adjacent electrodes of the respective first electrodes 11 and the respective second electrode 12 was set to 0.03 mm. The electrode width of the first electrodes was set to 0.185 mm, and the electrode width of the second electrodes was set to 0.4 mm in types I, K, and L, and the average value of the broadest width and the narrowest width was set to 0.4 mm in type J. The flexion angle θ (theta) was set to 5° (degrees), 10° (degrees), and 15° (degrees) in all cases. The direction of the alignment treatment, the director of the liquid crystal molecules at the substantial center of the liquid crystal layer 3, and the status of arrangement of the respective polarizers were as described above.

Figure 32:
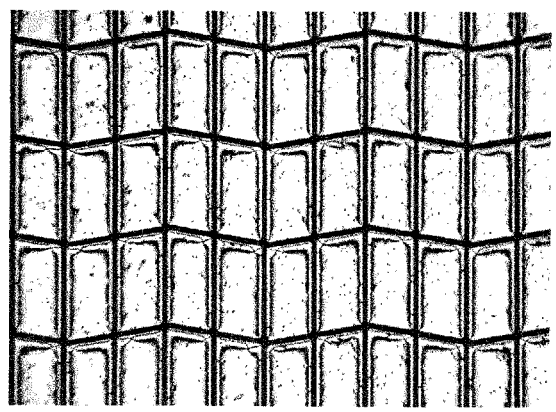
FIG. 32 is a diagram showing the alignment texture observed image during voltage application in the type I electrode structure.

FIG. 32 is a diagram showing the alignment texture observed image during voltage application in the type I electrode structure. As shown in the diagram, it was confirmed that the uniformity of the dark regions appearing respectively in the vicinity of the short side and long side of the pixel edges had improved in comparison to the conventional liquid crystal display device. The display uniformity had also improved considerably in the appearance observation from the anti-viewing direction in comparison to the conventional liquid crystal display device, and it was confirmed that extremely favorable uniformity could be realized.

Figure 33:
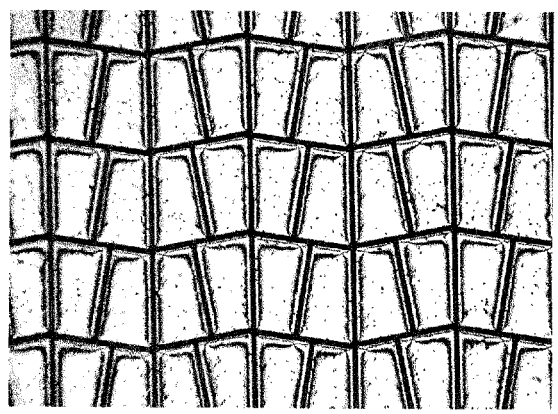
FIG. 33 is a diagram showing the alignment texture observed image during voltage application in the type L electrode structure.

FIG. 33 is a diagram showing the alignment texture observed image during voltage application in the type L electrode structure. As with the example shown in FIG. 32, the uniformity of the dark regions appearing respectively in the vicinity of the short side and long side of the pixel edges had improved, the display uniformity had also improved considerably in the appearance observation from the anti-viewing direction in comparison to the conventional liquid crystal display device, and it was confirmed that extremely favorable uniformity could be achieved.

With respect to the liquid crystal display devices of the examples respectively shown in FIG. 32 and FIG. 33, based on the multiplex driving conditions of 1/64 duty, 1/9 bias and a frame inverted waveform, on examining the lower limit of the frame frequency capable of obtaining display uniformity in a light display state when viewed from the front, the lower limit of the frame frequency was 80 Hz and 75 Hz, respectively. And it was revealed that the lower limit of the frame frequency could be reduced in comparison to the conventional liquid crystal display device.

Note that, in the foregoing fourth embodiment, although the electrode edges on either side of the first electrode and the second electrode were of the same shape, they can also be of different shapes.

Note that this invention is not limited to the subject matter of the foregoing embodiments, and can be implemented by being variously modified within the scope of the gist of the present invention.

What is claimed is:

1. A liquid crystal display device, comprising:
   a first substrate and a second substrate which are placed opposite to each other;
   a first electrode which is provided on a first surface of the first substrate and which extends in a first direction;
   a second electrode which is provided on a first surface of the second substrate and which extends in a second direction that is substantially orthogonal to the first direction; and
   a substantially vertically-aligned liquid crystal layer provided between the first surface of the first substrate and the first surface of the second substrate,
   wherein a region where the first electrode and the second electrode overlap each other defines a pixel,
   wherein an orientation direction of liquid crystal molecules at a substantial center in a layer thickness direction of said liquid crystal layer is substantially parallel to the first direction,
   wherein the first electrode is of a linear shape in which electrode edges on either side extend in the first direction,
   wherein the second electrode is of a polygonal line shape in which an electrode edge of at least one side includes a line segment which obliquely crosses the first direction,
   wherein the pixel is demarcated by pixel edges including plural obliquely crossing line segments, and
   wherein the obliquely crossing line segments form angles that are greater than 0° and less than or equal to 15° with reference to the second direction.

2. The liquid crystal display device according to claim 1,
   wherein the obliquely crossing line segments are configured by connecting a first straight line and a second straight line extending in mutually different directions,
   wherein a length Xa measured in the second direction corresponds to the first straight line, and a length Xb measured in the second direction corresponds to the second straight line,
   wherein the first straight line and the second straight line are of a relationship where the length Xa is three times or more than the length Xb, and
   wherein the first straight line is inclined to form an angle that is greater than 0° and less than or equal to 15° with reference to the second direction.

3. The liquid crystal display device according to claim 2, wherein the obliquely crossing line segments are disposed on a side in an anti-viewing direction among the pixel edges.

4. The liquid crystal display device according to claim 1,
   wherein the obliquely crossing line segments are configured by connecting a first straight line and a second straight line, wherein a length of the first straight line is substantially equal to a length of the second straight line, and wherein the first straight line and the second straight line extend in mutually different directions, and
   wherein the first straight line and the second straight line are obliquely crossed and respectively form angles that are greater than 0° and less than or equal to 15° with reference to the second direction.

5. The liquid crystal display device according to claim 4, wherein the obliquely crossing line segments are disposed on a side in an anti-viewing direction among the pixel edges.

6. The liquid crystal display device according to claim 1, wherein the obliquely crossing line segments are disposed on a side in an anti-viewing direction among the pixel edges.

* * * * *